United States Patent
Okano et al.

(10) Patent No.: US 12,135,373 B2
(45) Date of Patent: Nov. 5, 2024

(54) SYSTEMS AND METHODS FOR LIDAR SENSING

(71) Applicant: Santec Holdings Corporation, Aichi (JP)

(72) Inventors: Masayuki Okano, Santa Clara, CA (US); Changho Chong, Los Altos, CA (US)

(73) Assignee: SANTEC HOLDINGS CORPORATION, Komaki (JP)

( * ) Notice: Subject to any disclaimer, the term of this patent is extended or adjusted under 35 U.S.C. 154(b) by 874 days.

(21) Appl. No.: 17/233,080

(22) Filed: Apr. 16, 2021

(65) Prior Publication Data

US 2022/0334260 A1    Oct. 20, 2022

(51) Int. Cl.
*G01S 17/89* (2020.01)
*G01S 7/486* (2020.01)
*G01S 17/894* (2020.01)
*G01S 17/931* (2020.01)

(52) U.S. Cl.
CPC ............ *G01S 17/894* (2020.01); *G01S 7/486* (2013.01); *G01S 17/931* (2020.01)

(58) Field of Classification Search
CPC ...... G01S 17/894; G01S 7/486; G01S 17/931; G01S 7/4815; G01S 7/4911; G01S 17/34; G01S 7/4817
See application file for complete search history.

(56) References Cited

U.S. PATENT DOCUMENTS

| | | |
|---|---|---|
| 5,979,760 A | 11/1999 | Freyman et al. |
| 9,490,607 B2 | 11/2016 | Chong |
| 10,838,047 B2 | 11/2020 | Chong |
| 11,067,671 B2 * | 7/2021 | Chong ................. G01S 7/4817 |
| 11,067,816 B1 | 7/2021 | Ghosh |

(Continued)

FOREIGN PATENT DOCUMENTS

| | | |
|---|---|---|
| EP | 3 097 382 B1 | 10/2022 |
| JP | 2016-502665 A | 1/2016 |

(Continued)

OTHER PUBLICATIONS

Chan T. [et al.]: 2-Dimensional beamsteering using dispersive deflectors and wavelength tuning. In: Optics Express, vol. 16, No. 19, 2008, S. 14617-14628.

(Continued)

*Primary Examiner* — Assres H Woldemaryam
(74) *Attorney, Agent, or Firm* — Foley & Lardner LLP

(57) ABSTRACT

System and methods for Light Detecting and Ranging (LIDAR) are disclosed. The LIDAR system includes a light source configured to generate a tunable beam, an optical beam steering device positioned to receive at least a portion of the beam and configured to sweep the beam over a range of angles in a field of view (FOV) wherein each discrete frequency of the beam corresponds to a different angle in the FOV, a detector configured to generate an interference signal based on the received portions of the beam, and a processor communicably coupled to the detector. The processor is configured to cause the light source to tune the tunable beam from a first frequency to a second frequency and to calculate a range of an object corresponding to either the first frequency or the second frequency within the FOV.

19 Claims, 26 Drawing Sheets

(56) References Cited

U.S. PATENT DOCUMENTS

| | | |
|---|---|---|
| 11,391,841 B2 | 7/2022 | Bondy et al. |
| 2003/0020903 A1 | 1/2003 | Healy et al. |
| 2003/0080899 A1* | 5/2003 | Lee .................. H01Q 3/2676 |
| | | 342/368 |
| 2003/0089778 A1 | 5/2003 | Tsikos et al. |
| 2003/0210389 A1 | 11/2003 | Matsumoto et al. |
| 2004/0036886 A1 | 2/2004 | Motamedi et al. |
| 2005/0030544 A1 | 2/2005 | VanWiggeren et al. |
| 2005/0088661 A1 | 4/2005 | Froggatt |
| 2006/0114471 A1 | 6/2006 | Cyr |
| 2007/0171367 A1* | 7/2007 | Sebastian ............... A61B 5/11 |
| | | 351/206 |
| 2008/0063028 A1* | 3/2008 | Lekkas .................. H04B 1/04 |
| | | 375/130 |
| 2009/0103100 A1 | 4/2009 | Froggatt et al. |
| 2011/0080561 A1 | 4/2011 | Hayashi et al. |
| 2011/0205523 A1* | 8/2011 | Rezk .................. G01B 9/02004 |
| | | 356/5.09 |
| 2011/0228218 A1 | 9/2011 | Hauger et al. |
| 2011/0273719 A1 | 11/2011 | Froggatt |
| 2013/0265545 A1 | 10/2013 | Buckland et al. |
| 2015/0177380 A1 | 6/2015 | Satyan et al. |
| 2016/0259038 A1 | 9/2016 | Retterath et al. |
| 2016/0266005 A1 | 9/2016 | Bos |
| 2016/0343169 A1 | 11/2016 | Mullins et al. |
| 2016/0356881 A1* | 12/2016 | Retterath ............ G01S 7/4865 |
| 2017/0009031 A1 | 1/2017 | Inokuchi et al. |
| 2017/0082735 A1 | 3/2017 | Slobodyanyuk et al. |
| 2018/0113200 A1* | 4/2018 | Steinberg ............ G01S 7/4918 |
| 2018/0172920 A1 | 6/2018 | Froggatt et al. |
| 2018/0238675 A1 | 8/2018 | Wan |
| 2019/0257927 A1 | 8/2019 | Yao |
| 2019/0317194 A1 | 10/2019 | Chong |
| 2019/0317199 A1* | 10/2019 | Chong .................... G01S 17/32 |
| 2020/0072941 A1 | 3/2020 | Jansen et al. |
| 2020/0072978 A1 | 3/2020 | Boloorian et al. |
| 2020/0081449 A1* | 3/2020 | Albelo .................. G01S 7/487 |
| 2020/0371239 A1* | 11/2020 | Rumala .................. G01S 7/4817 |
| 2021/0063549 A1 | 3/2021 | Chong |
| 2021/0116655 A1 | 4/2021 | Grieco et al. |
| 2021/0157000 A1 | 5/2021 | Imaki |
| 2021/0247497 A1 | 8/2021 | Li et al. |
| 2021/0247498 A1 | 8/2021 | Shi et al. |
| 2021/0356359 A1 | 11/2021 | Cyr et al. |
| 2021/0405194 A1 | 12/2021 | Tsuchida |

FOREIGN PATENT DOCUMENTS

| | | | |
|---|---|---|---|
| JP | 2017-502315 A | 1/2017 | |
| JP | 2018-529099 | 10/2018 | |
| WO | WO-2015/087564 A1 | 6/2015 | |
| WO | WO-2017/054036 A1 | 4/2017 | |
| WO | WO-2017/176901 A1 | 10/2017 | |
| WO | WO-2019/204301 A1 | 10/2019 | |
| WO | WO-2020/135802 A1 | 7/2020 | |
| WO | WO-2021034798 A1 * | 2/2021 | ............. G01S 17/10 |

OTHER PUBLICATIONS

Koyama F. [et al.]: Beam Steering, Beam Shaping, and Intensity Modulation Based on VCSEL Photonics, in IEEE Journal of Selected Topics in Quantum Electronics, vol. 19, No. 4, Jul.-Aug. 2013, S. 1701510-1701510, DOI: 10.1109/JSTQE.2013.2247980.

Office Action for German Application No. 112019002028.5 Dtd Feb. 1, 2022, 8 pages.

Sandborn P.: FMCW Lidar: Scaling to the Chip-Level and Improving Phase-Noise-Limited Performance. University of California, Berkeley, 2017.

Snyder, "Wide dynamic range optical power measurement using coherent heterodyne radiometry," Applied Optics, Nov. 1, 1988, vol. 27, No. 21, pp. 4465-4469.

Alshamrani et al., "A Non-Mechanical Multi-Wavelength Integrated Photonic Beam Steering System," Journal of Lightwave Technology, vol. 39, No. 12, Jun. 15, 2021, pp. 4201-4208.

Doerr et al., "Silicon-photonics multi-wavelength common-gain tunable laser providing both source and pump for an amplified transceiver," Opt. Lett. 46, 625-628 (2021) https://opg.optica.org/ol/abstract.cfm?URI=ol-46-3-625.

Jeong et al.; Spectral-domain OCT with dual illumination and interlaced detection for simultaneous anterior segment and retina imaging. In: Optics Express. 2012, Bd. 20, H. 17, S. 19148-19159.

Van Rees et al., "Ring resonator enhanced mode-hop-free wavelength tuning of an integrated extended-cavity laser," Opt. Express 28, 5669-5683 (2020).

Xiang et al. High-performance lasers for fully integrated silicon nitride photonics. Nat Commun 12, 6650 (2021). https://doi.org/10.1038/s41467-021-26804-9.

International Search Report and Written Opinion for International Application No. PCT/US2021/019341 mailing date May 3, 2021, 10 pages.

Masayuki Okano and Changho Chong, "Swept Source Lidar: simultaneous FMCW ranging and nonmechanical beam steering with a wideband swept source," Opt. Express 28, 23898-23915 (2020).

Qian, Ruobing, et al. "Video-Rate High-Precision Time-Frequency Multiplexed 3D Coherent Ranging." ArXiv.org, Oct. 20, 2020, arxiv.org/abs/2008.05805.

International Search Report on PCT/US2022/014505 dated May 11, 2022 (11 pages).

* cited by examiner

SYSTEMS AND METHODS FOR LIDAR SENSING

TECHNICAL FIELD

The present application relates generally to the field of sensing and, more specifically, to Light Detection and Ranging (LIDAR) sensing arrangements.

BACKGROUND

LIDAR systems use light for detecting a distance between a light source and a target. A beam (e.g., a laser) is directed toward the target. LIDAR systems typically identify the time it takes for light to reach the target, be deflected off the target, and return to a detector. Based on this time and the speed of light, a distance to the target is determined. Detection of targets and determinations of positions of targets throughout a three dimensional space are required to be performed in a reliable, continuous, and timely manner in order for a machine (i.e., an autonomous vehicle) to operate safely.

SUMMARY

The present technology provides systems and methods for LIDAR that are capable of capturing, tracking, and determining velocity of an object within a field of view (FOV).

System and methods for Light Detecting and Ranging (LIDAR) are disclosed. The LIDAR system includes a light source configured to generate a tunable beam, an optical beam steering device positioned to receive at least a portion of the beam and configured to sweep the beam over a range of angles in a field of view (FOV) wherein each discrete frequency of the beam corresponds to a different angle in the FOV, a detector configured to generate an interference signal based on the received portions of the beam, and a processor communicably coupled to the detector. The processor is configured to cause the light source to tune the tunable beam from a first frequency to a second frequency and to calculate a range of an object corresponding to either the first frequency or the second frequency within the FOV.

The foregoing summary is illustrative only and is not intended to be in any way limiting. In addition to the illustrative aspects and features described above, further aspects and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Figure 1:
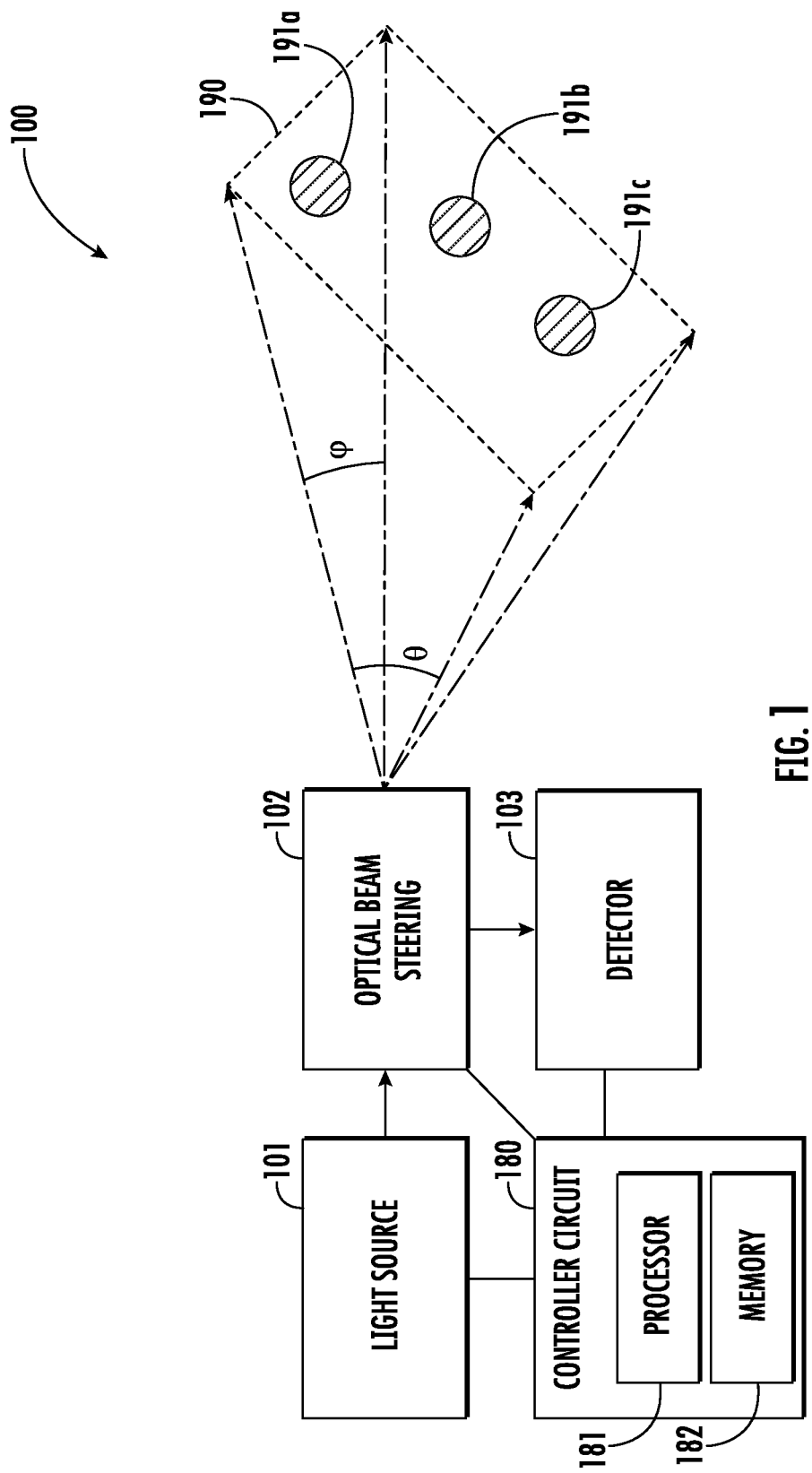
FIG. 1 depicts a block diagram of a LIDAR system in accordance with an illustrative embodiment.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Described herein are systems and methods for LIDAR sensing. As will be discussed in further detail below, disclosed herein is a LIDAR sensing system that includes a light source that is controlled to project a beam (e.g., infrared beam, beam, collimated beam, etc.) at various wavelengths. The beam is directed toward a wavelength dispersive element. The beam is projected from one or more wavelength dispersive elements at an angle that corresponds to the wavelength of the beam. As a result of changing wavelengths of the beam, the LIDAR sensing system generates a scan along a first axis (e.g., a two-dimensional scan) of a field of view (FOV) of the external environment. A beam steering device may be used to allow the LIDAR sensing system to create multiple vertical scans along a horizontal axis (or vice versa) to create a three-dimensional scan of a field of view (FOV) of the LIDAR sensing system. In some embodiments, the three-dimensional scan of the FOV is accomplished with only static elements (e.g., the first and second elements of the wavelength dispersive elements are both static elements). Various arrangements and techniques described herein allow for a three-dimensional space around the LIDAR system to be measured, segmented, and calculated in near real-time to allow for the advancement of electronics. As a result the LIDAR system can be implemented in applications where objects must be tracked with precision (e.g., an autonomous vehicle).

Referring to FIG. 1, a block diagram of a LIDAR sensing system 100 is shown. The LIDAR sensing system 100 includes a light source 101, an optical beam steering device 102, and a detector 103. The LIDAR sensing system 100 projects one or more beams of light generated by the light source 101 into the external environment within a field of view (FOV) 190 to detect, range, and/or track one or more objects 191a-c (e.g., targets) within the FOV 190. In some embodiments, the LIDAR sensing system 100 also includes a controller circuit 180 having a processor and memory and coupled to the light source 101, optical beam steering device 102, and/or the detector 103. The memory may have computer-readable instructions stored thereon that, when executed by the processor, cause the operations of the LIDAR sensing system 100 described herein.

The light source 101 is configured to output or project a beam toward the optical beam steering device 102. In some embodiments, the beam (e.g., a laser beam) has a selectable, discrete frequency. Additionally, the light source 101 is configured to adjust a wavelength λ (e.g., and thereby frequency) of the beam. That is, in some embodiments, the light source 101 may be a tunable laser where the wavelength λ of the laser is tuned or selected. The light source 101 may be configured to adjust the wavelength λ of the beam across a range. In some examples, the range of wavelengths λ may be between 1.25 μm and 1.35 μm. The light source 101 may be swept across the range of wavelengths λ, as will be discussed in greater detail below. In some embodiments, the light source 101 may be swept continuously across the range of wavelengths from a first wavelength (and thereby a first frequency) to a last wavelength (and thereby a last frequency). The light source 101 may be swept continuously from the first wavelength to the last wavelength in a linear or non-linear pattern. In some embodiments, the light source 101 may include one or more tunable lasers that are cascaded together in order for the light source 101 to have a greater range of wavelengths λ.

The optical beam steering device 102 is arranged to receive the beam (e.g., at least a portion of the beam) from the light source 101 and project the beam into the external environment throughout the FOV 190 and direct reflected portions of the beam (e.g., from the targets 191a-c) back to a detector 103. That is, the light source 101 is arranged to project components of a beam to the optical beam steering device 102. The optical beam steering device 102 receives the beam and directs portions of the beam into the FOV 190. The portions of the beam reflect from objects 191a-c in the FOV 190 and at least a portion of the reflected beam is received back at optical beam steering device 102. The optical beam steering device 102 receives the portion of the reflected beam and directs the portion of the reflected beam toward the detector 103. The detector 103 receives the portions of the reflected beams and generates an electrical signal that is indicative of the received portions of the reflected light and thereby indicative of the object. The electrical signal may be transmitted to a processor of the controller circuit 180 that may process the electrical signal (e.g., an object signal) in order to determine a range and/or velocity of the objects 191a-c in the FOV 190.

In some embodiments, the optical beam steering device 102 may include one or more wavelength dispersive elements configured to project the beam at an angle based on the frequency of the beam. For example, in some embodiments, the FOV 190 may be defined along a first angle θ by the extrema of the frequencies of the beam projected by the light source 101. In this way, in some embodiments, the optical beam steering device 102 may be configured to disperse a light beam along the first angle θ of the FOV 190 based on the characteristics (e.g., wavelengths) of the light beams.

In some embodiments, the optical beam steering device 102 may use various techniques or devices in order to scan along a second angle φ of external environment as described in additional detail below. The extrema of the second angle φ may define the FOV 190 along the second angle thereby creating a three dimensional FOV 190. In this way, in some embodiments, the optical beam steering device 102 may be configured to disperse a light beam along the first angle and the second angle to scan the external environment.

The detector 103 is configured to and positioned within the system to receive portions of light reflected from objects within the FOV 190. In some embodiments, the detector 103 is positioned to receive the portions of the light reflected from objects within the FOV 190 and a portion of beam (e.g., reference beam) in order to generate an interference signal. In some embodiments, the detector 103 may be communicably coupled to the controller circuit 180 (e.g., the processor). In some embodiments, the detector 103 includes an infrared sensor, a camera, an infrared camera, or any other light detecting device that can sense the frequency of received light. The detector 103 is positioned such that light received at the optical beam steering device 102 (e.g., light reflected from the objects 191a-c) can be directed to the detector 103. For example, in some embodiments, the LIDAR system 100 may include various optical elements such as half-mirrors, reciprocal mirrors, half-silvered mirrors, or other optical elements configured to direct light from the light source 101 toward the optical beam steering device 102 and direct light from the optical beam steering device 102 toward the detector 103. The detector 103 is configured to generate an object signal that is indicative of the portions of the beam detected by the detector 109. In some embodiments, the object signal is in the form of an electrical signal and transmitted to the computing system 112 for processing.

The controller circuit 180 includes a processor 181 and memory 182. The processor 181 may include any component or group of components that are configured to execute, implement, and/or perform any of the processes or functions described herein or any form of instructions to carry out such processes or cause such processes to be performed. In one or more arrangements, the processor 181 may be a main processor of the LIDAR sensing system 100. Examples of suitable processors include microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 181 may include at least one hardware circuit (e.g., an integrated circuit) configured to carry out instructions contained in program code. In arrangements in which there is a plurality of processors, such processors may work independently from each other or one or more processors may work in combination with each other.

The memory 182 may be structured for storing one or more types of data. The memory 182 store may include volatile and/or non-volatile memory. Examples of suitable memory 182 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. In some embodiments, the memory 182 includes a non-transitory computer readable storage medium that is communicably coupled to the processor 181. The computer-readable storage medium may have instructions encoded or otherwise stored thereon that, when executed by the processor, cause the processor to perform any of the operations, steps, or methods described herein. The memory 182 may be a component of the processor 181, or the memory 182 may be operatively connected to the processor 181 for use thereby. In some arrangements, the memory 182 may be located remotely and accessible by the processor 181, such as via a suitable communications device.

The processor 181 is communicably coupled to the light source 101 and may be configured to read and execute instructions from a light source controller stored or programmed on the memory 182. The light source controller may be or include computer-readable instructions to control one or more aspects of the light source 101. The light source controller may be stored on memory 182 as shown. In other implementations, the light source controller 182 may be stored remotely and accessible by various components of the LIDAR sensing system 100. The processor 181 may control the light source 101 in accordance with the instructions from the light source controller 118.

The light source controller may include instructions to generate a pattern for the beam projected from the light source 101. For instance, in some implementations, the beam may be projected from the light source 101 in a pattern having a frequency (e.g., pulsed, saw tooth, etc.). The light source controller may include instructions to generate, for example, a saw tooth signal that corresponds to the frequency pattern of the beam projected from the light source 101. In some embodiments, the light source controller 118 may include instructions that cause the light source 101 to generate a beam that sweeps from a first frequency at a first time to a second frequency over a ramp up time period and from the second frequency back to the first frequency over a ramp down time period. In some embodiments, the light source controller may include instructions to cause the light source to generate one frame or multiple frames. In some embodiments, the multiple frames are periodic and have a set time period between each frame. As will be discussed in further detail below, the frequency pattern of a frame may be used for determining a range and/or velocity of object.

In some embodiments, one or more components of the LIDAR system 100 may be omitted. In some embodiments, various other components of the LIDAR system 100 may be included. It is to be appreciated that FIG. 1 is one example of an implementation of a LIDAR system 100 and that it is not meant to be limiting.

For example, in some embodiments, the LIDAR system 100 may include an interferometer. The interferometer may be or include components arranged to receive the beam from the light source 101, and split the beam into one or more component beams. For instance, the interferometer 110 may split the beam into an object beam and a reference beam. The object beam may be projected towards the wavelength dispersive element 104, and the reference beam may be projected towards a reference mirror. The interferometer may generate an interference pattern based on a difference between light reflected off surfaces of objects 191*a-c* in the external environment and light reflected off the reference mirror. The LIDAR sensing system 100 (e.g., processor 114) may determine a distance to the objects based on the interference pattern (e.g., interference signal).

Figure 2:
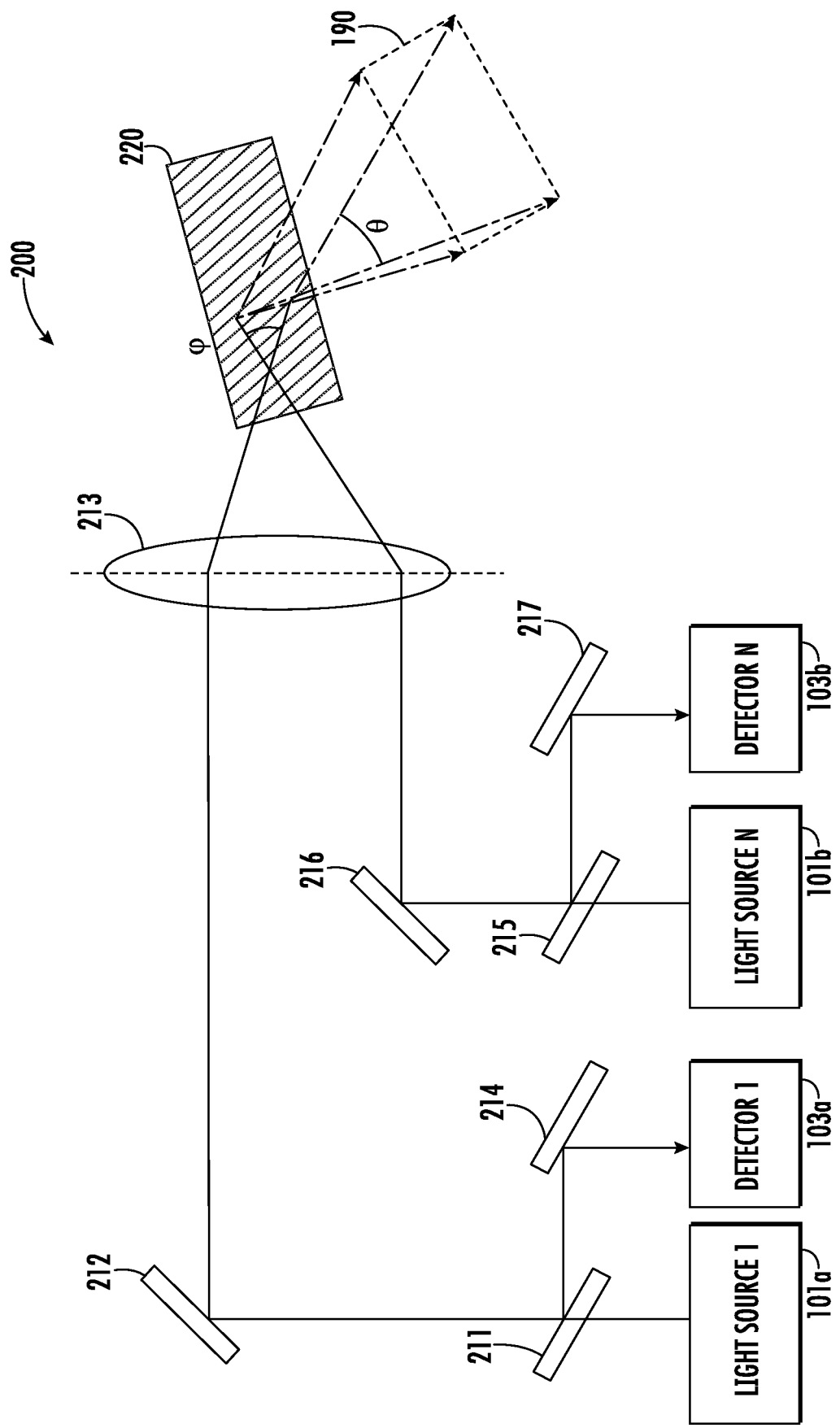
FIG. 2 depicts a first example of a LIDAR system in accordance with an illustrative embodiment.

Referring now to FIG. 2, an example of a LIDAR system 200 is shown. Reference to various components of FIG. 1 are made while discussing FIG. 2 for purposes of demonstration. In FIG. 2, the LIDAR system 200 includes multiple light sources 101*a-b* and multiple detectors 103*a-b*. In this example, each light source 101*a-b* has a respective detector 103*a-b*. In this arrangement, an array of N light sources 101*a-b* can be used to scan the external environment along the second angle.

The light sources 101*a-b* may include tunable lasers that are configured to project a beam of light over a variety of frequencies, for example, from a first frequency to a last frequency. Each of the light sources 101*a-b* are arranged to project a respective beam toward a wavelength dispersive element 220. The respective beams impinge on the wavelength dispersive element at a different location, which allows the respective beams to be projected into the external environment along the second angle. As described above, the wavelength dispersive element 220 projects the respective beams into the external environment along the first angle dependent on the frequency of the beam. In some embodiments, each of the light sources 101*a-b* may have different bandwidths (e.g., frequency ranges). The varying or controlled bandwidths of each light source 101*a-b* allows for different ranges of angles along the first angle to scanned at different angles along the second angle thereby allowing the field of view 190 to be different shapes.

In FIG. 2, each of the light sources 101*a-b* are paired with a respective detector 103*a-b* arranged to receive portions of a respective beam from the external environment. Advantageously, this allows for each of the paired light sources 101*a-b* and respective detectors 103*a-b* to perform a scan of the external environment at the same time. In this way, an entire three-dimensional scan of the FOV 190 may be performed simultaneously or near-simultaneously thereby reducing the amount time for the LIDAR system 200 to generate a three-dimensional scan of the external environment.

In an embodiment, a first of the light sources 101*a* projects a first beam toward a first optical element 211. The first beam is further projected to a second optical element 212 that aligns the first beam with a first portion of a third optical element 213. The third optical element 213 then directs (e.g., refracts or reflects) the first beam to a first portion of the wavelength dispersive element 220. The first beam is dispersed into the external environment according the frequency of the beam and light reflected off of objects within the external environment are reflected back along the same path which the first beam left the LIDAR system 200 back to the first optical element 211. The reflected beam is then directed to a fourth optical element 214 and to a first detector 214. Similarly, a second light source 101b (e.g., the Nth light source) projects a second beam toward a fifth optical element 215 and to a sixth optical element 216 that directs the second beam to a second portion of the third optical element 213. The third optical element 213 then directs (e.g., refracts or reflects) the first beam to a second portion of the wavelength dispersive element 220 that then disperses the second beam into the external environment. Portions of the second beam may be reflected from objects in external environment and directed back to a second detector 103b (e.g., the Nth detector) via a seventh optical element 217. In other embodiments, other arrangements or optical elements may be used for the paired scanning. In some embodiments, the LIDAR system 200 may include two, three, four, five, or an N amount light sources 101a-b paired with respective detectors. In this example, the paired light sources 101a-b with respective detectors 103a-b allows for co-axial detection of objects within the FOV 190. In alternative embodiments, a separate detector array may be used to receive the reflected beams for off-axial detection. For example, an off-axial detector or detector array may be positioned or arranged to receive reflected beams directly or through optical elements such as lenses, mirrors, and so on.

Figure 3A:
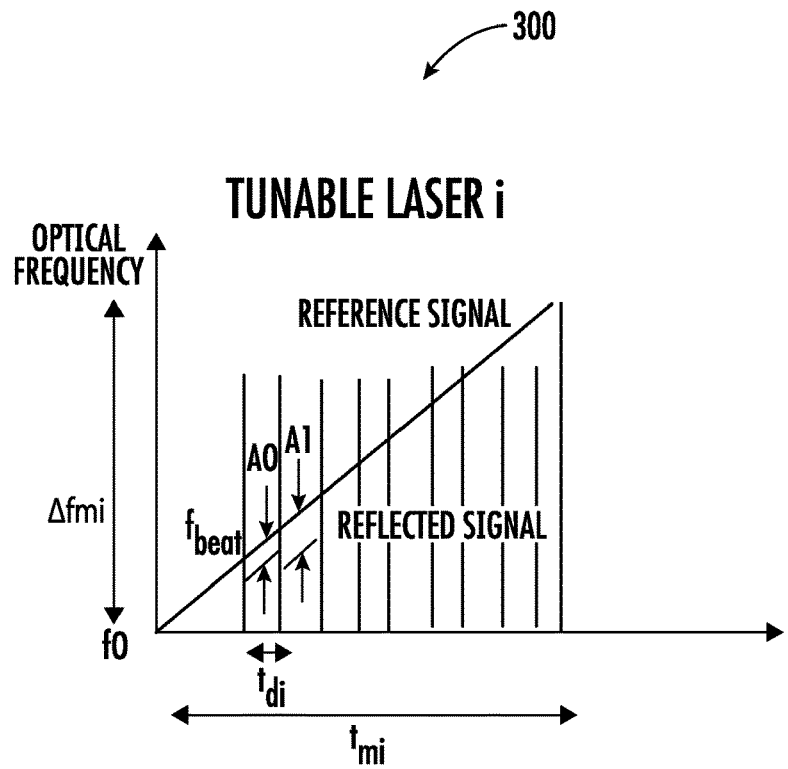
FIGS. 3a-3b depict examples of detection scans of LIDAR system in accordance with an illustrative embodiment.
Figure 3B:
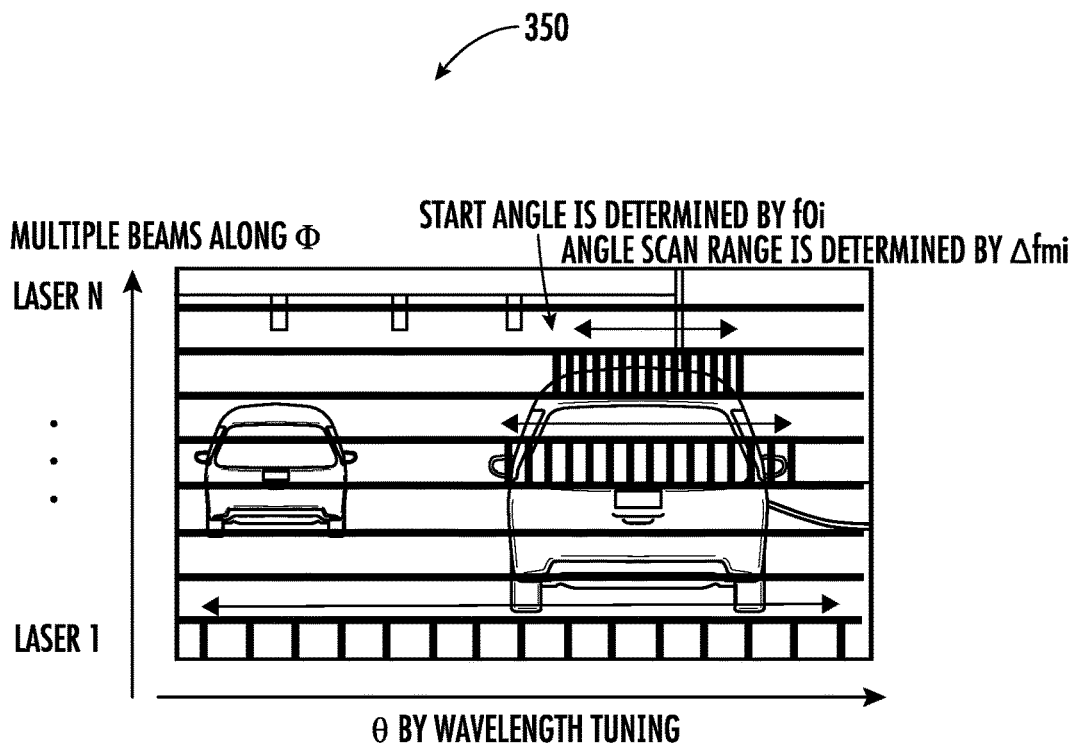

Referring now to FIGS. 3a-b, examples of detection scans of the LIDAR system 200 are shown. FIG. 3a depicts a signal graph 300 of a first beam of the LIDAR system 200. FIG. 3b depicts a multiple beam scan 350 of the LIDAR system 200. The signal graph 300 includes a y-axis representative the bandwidth or frequency range $\Delta f_{mi}$ offset by a set frequency $f_{oi}$, for example, of the first light source 101a and an x-axis representative of the time for the tuning period $t_{mi}$ of, for example, the first light source 101a over a sweep of frequencies. The signal graph 300 includes a reference signal 301 that is indicative of the sweep of frequencies by, for example, the first light source 101a, a first reflected signal 302 indicative of a first object $A_0$, and second reflected signal 303 indicative of a second object $A_1$. The control circuitry 180 may calculate the position of the first and second objects relative to the LIDAR system 200 based on a beat frequency of the first and second signals, respectively.

Referring now to FIG. 3b, the multiple beam scan 350 includes a y-axis representative of the light sources 101a-b and an x-axis representative of the first angle θ. For example, the multiple beam scan 350 is a depiction of the FOV 190 where the y-axis of the FOV 190 is based on the light source arrangement of the LIDAR system 200 and the x-axis is based on the frequency of the beam. In an example, the LIDAR system 200 may perform a first scan of the entire FOV 190 at a first time. The first scan may indicate to the controller circuit 180 that an object near (e.g., within a pre-defined range of) the LIDAR system 200. Accordingly, the controller circuit 180 may determine that the object should be monitored closely or segmented for further analysis. As such, the controller circuit 180 determines which light sources 101a-b to activate (e.g., sweep) for the seg-mentation of the object. In subsequent sweeps, the controller circuit 180 may sweep, for example, a particular light source of the multiple light sources 101a-b from a set frequency $f_{oi}$, over a range of frequencies $\Delta f_{mi}$ unique to the object in order to scan within the range of the detected object. As an example, in FIG. 3b, the detected object may be a car within a pre-defined range and the controller circuit 180 may determine that a fifth and sixth light source should be swept from the set frequency over a calculated range of frequencies to monitor, segment, and/or dissect the detected car at various position in the y-axis. Moreover, the controller circuit 180 may perform sweeps or scans over the maximum range of frequencies using other light sources (e.g., the first light source 101a) to monitor for other objects that may appear within the FOV 190. In this way, the controller circuit 180 may increase the speed of scans of the external environment in a dynamic and particular way that increases the efficiency of the LIDAR system 200.

Figure 4:
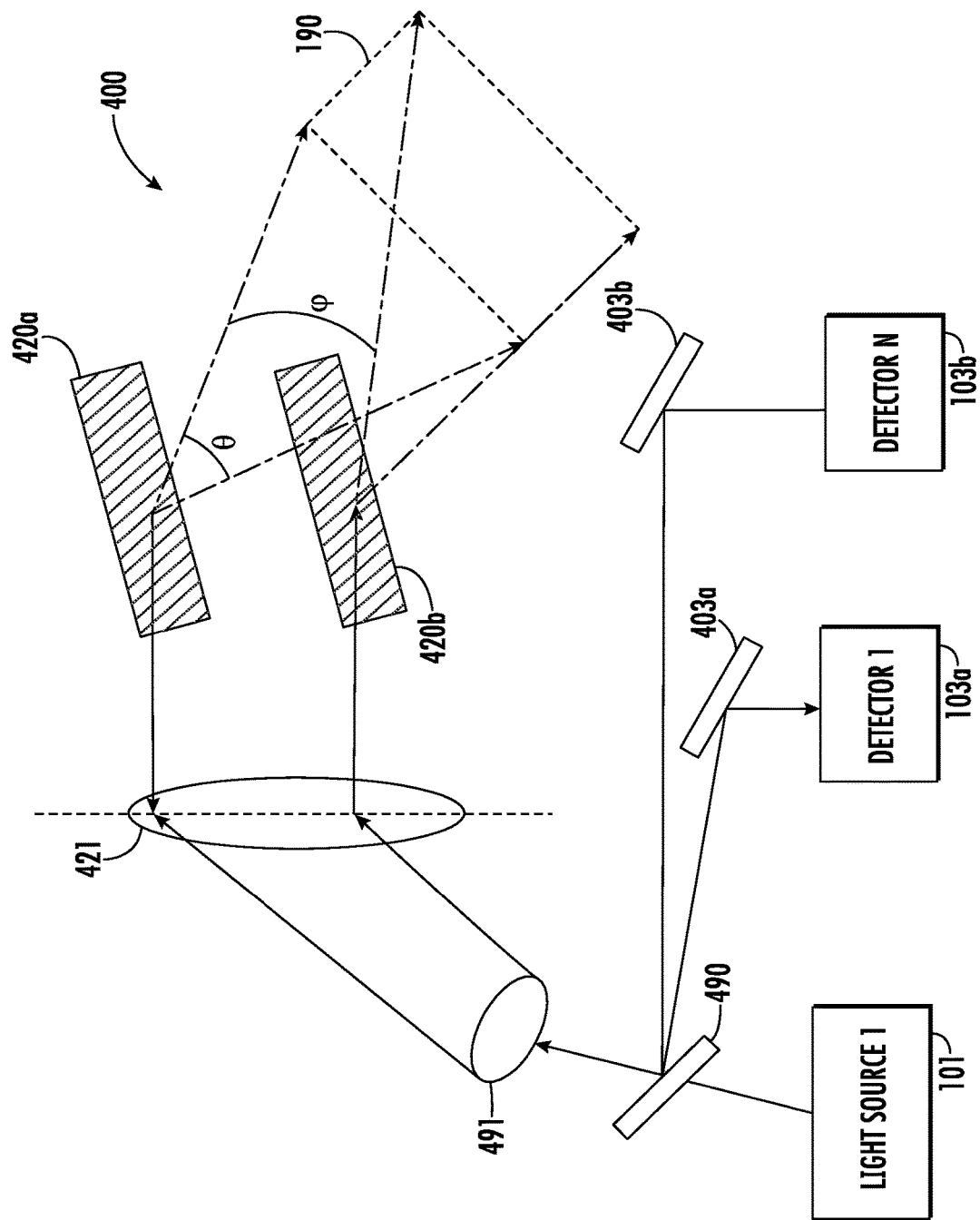
FIG. 4 depicts a second example of a LIDAR system in accordance with an illustrative embodiment.

Referring now to FIG. 4, another example of a LIDAR system 400 is depicted. Reference to various components of FIG. 1 are made while discussing FIG. 4 for purposes of demonstration. The LIDAR system 400 includes multiple (e.g., an N amount) wavelength dispersive elements 420a-b with an optical element 421 that is configured to project a beam from the light source 101a onto the wavelength dispersive elements 420a-b. The multiple wavelength dispersive elements 420a-b are positioned such that various portions of the beam are dispersed along the second angle φ of the external environment. The varying frequency or tuning of the beam allow for the scans along the first angle θ of the external environment. In this arrangement, an entire scan of the FOV 190 may be achieved by a single frequency scan or sweep from the light source 101.

Figure 5:
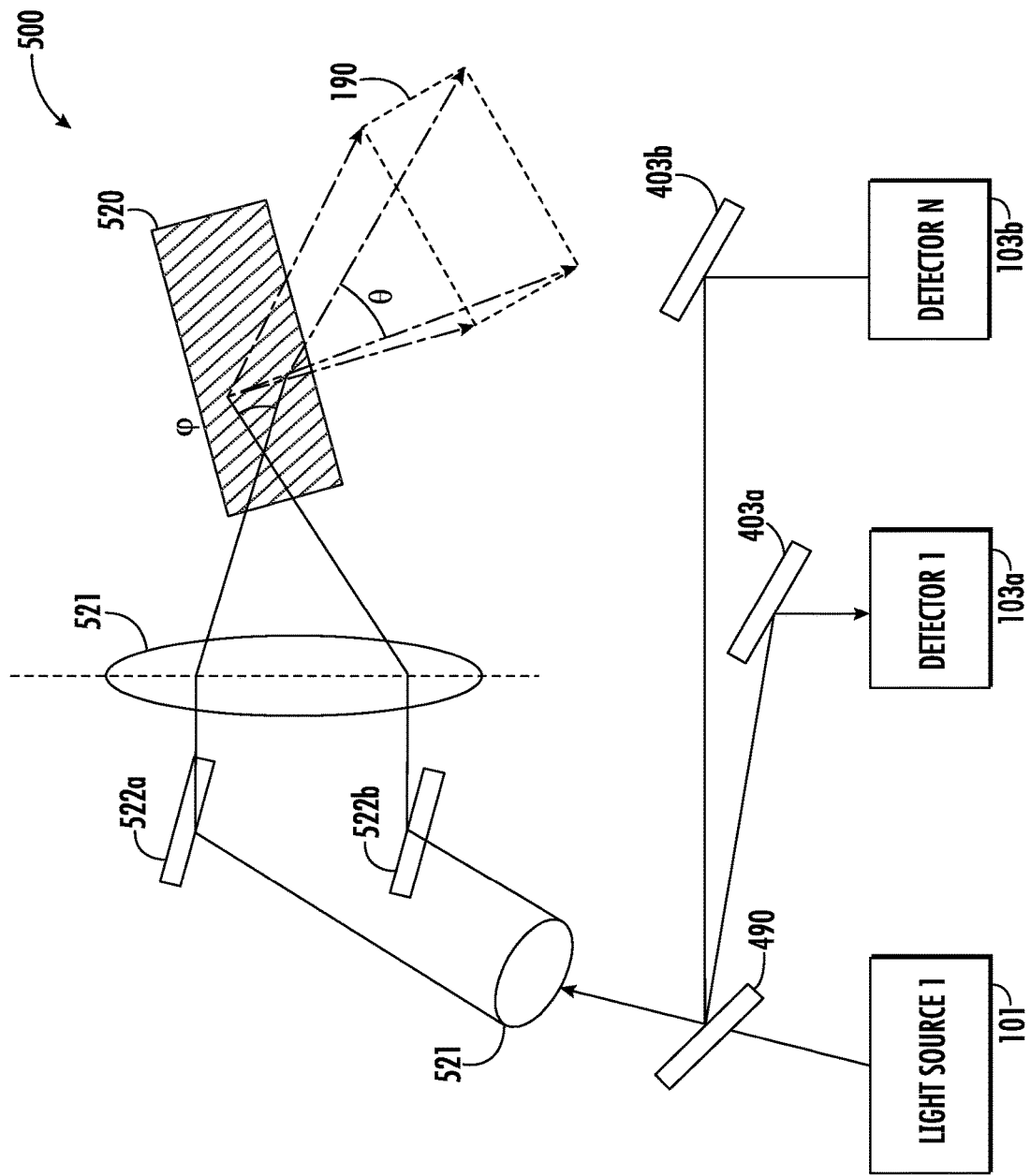
FIG. 5 depicts a third example of a LIDAR system in accordance with an illustrative embodiment.

Referring now to FIG. 5, another example of a LIDAR system 500 is depicted. The LIDAR system 500 includes a wavelength dispersive element 520 with multiple optical elements 522a-b (e.g., mirrors) and a second optical element 521 (e.g., a lens). The multiple optical elements 522a-b are positioned to direct respective portions of a beam from the light source 101 through the second optical element 521 and onto the respective portions of the wavelength dispersive element 520. The arrangement and structure of the multiple optical elements 522a-b (e.g., mirrors) and the second optical element 521 (e.g., the lens) allow for various portions of the beam to be projected toward respective portions of the wavelength dispersive element 520 and thereby dispersed along the second angle φ of the external environment. The varying frequency or tuning of the beam allow for the scans along the first angle θ of the external environment. In this arrangement, an entire scan of the FOV 190 may be achieved by a single frequency scan or sweep from the light source 101.

Referring now to FIGS. 4 and 5, the LIDAR systems 400 and 500 include an array of detectors 103a-103b. In some embodiments, the number of detectors in the array may be the same as the number of wavelength dispersive elements 420a-b or the multiple optical elements 522a-b (e.g., mirrors). In an example, the light source 101 projects a beam toward a first element 490. The beam may traverse the first element 490 and be directed toward a second element 491 (e.g., a collimated lens). From the second element 491, the beam is either projected onto the multiple wavelength dispersive elements 420a-b, as depicted in FIG. 4, or onto the wavelength dispersive element 520, as depicted in FIG. 5, and into the external environment. Portions of the beam are reflected from objects in the FOV 190 back toward the first element 490 that directs (e.g., reflects or refracts) the portions of the beam toward a respective detector 103a-b. In some embodiments, the respective portions of the beam are directed from the first element 490 toward respective optical elements 403a-b that direct the portions of the beam toward the respective detector 103a-b.

Figure 6A:
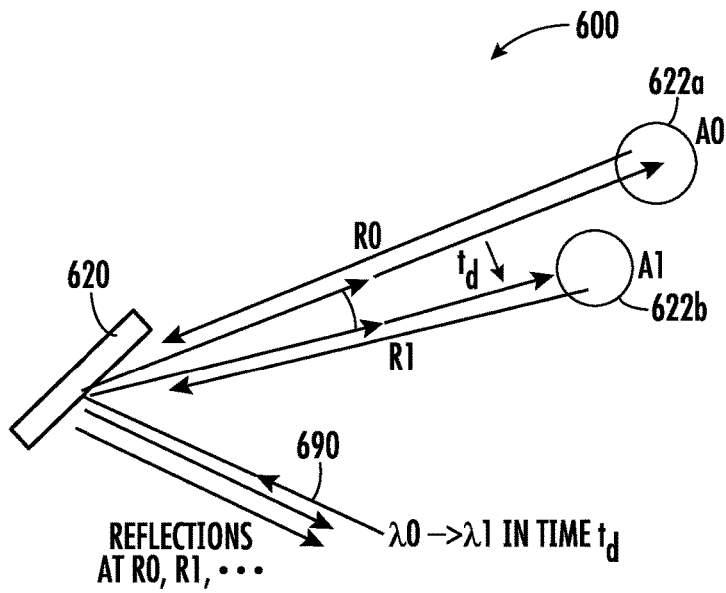
FIGS. 6a and 6b depict additional examples of detection scans of a LIDAR system in accordance with an illustrative embodiment.
Figure 6B:
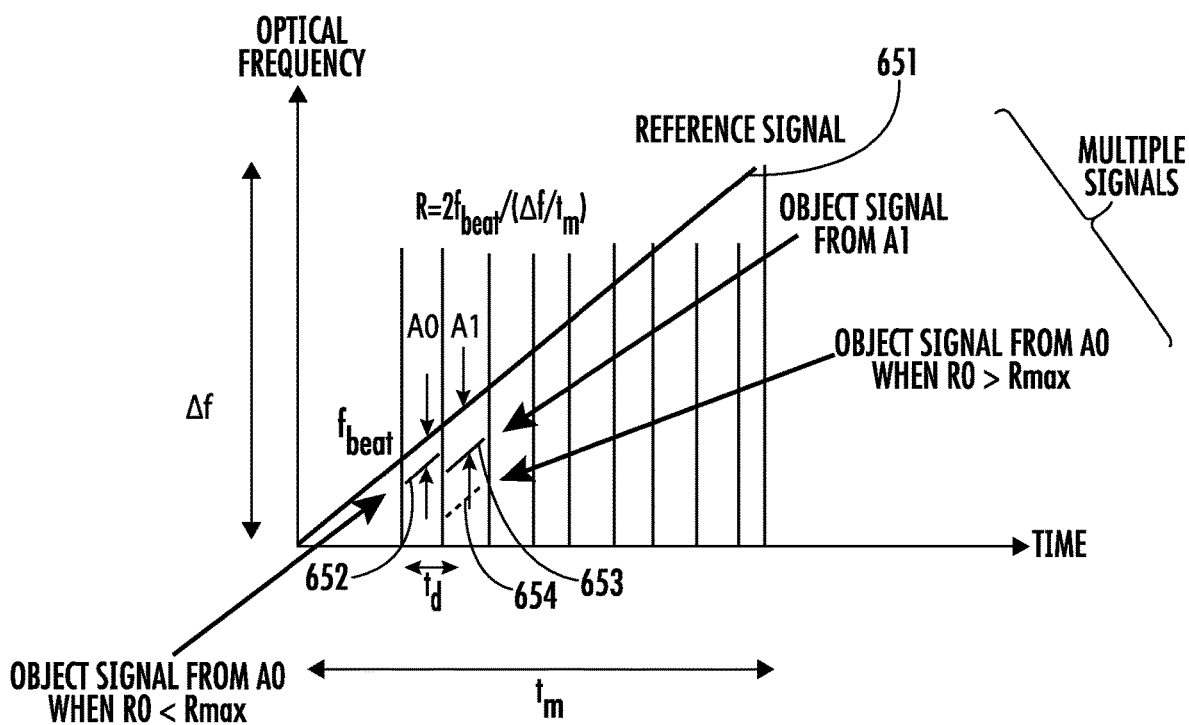

Referring now to FIGS. 6a and 6b, an example of a detection scan is depicted. FIG. 6a depicts a two dimensional scan 600 using frequency tuning. FIG. 6b depicts a respective signal graph 650 of the two dimensional scan. The two dimensional scan 600 includes a wavelength dispersive element 620 that disperses a beam 690 into an external environment at an angle dependent on the frequency of the beam. In this example, the external environment includes a first object 622a and a second object 622b. The first object is a first distance $R_0$ away from the wavelength dispersive element 620 and the second object is a second distance $R_1$ away from the wavelength dispersive element 620. During a two-dimensional scan, the beam 690 is directed toward the first object 622a over a first range of frequencies and directed toward the second object 622b over a second range of frequencies.

The signal graph 650 includes a first signal 651 representing a frequency of the beam relative to time (e.g., the frequency sweep of the beam). The signal graph 650 also includes a second signal 652 representing a detected portion of the beam that was reflected from the first object 622a back to a detector when the first distance $R_0$ is less than a maximum distance $R_{MAX}$ and a third signal 653 representing a detected portion of the beam that was reflected from the second object 622b back to the detector. The also includes a fourth signal 654 representing a detected portion of the beam that was reflected from the first object 622a back to a detector when the first distance $R_0$ is greater than a maximum distance $R_{MAX}$. The maximum distance may be the speed of light multiplied by a time period $t_d$ divided by two.

In an embodiment, the controller circuit 180 may use a low pass or a band pass filter to limit a range of detection $R_{det}$ such that a respective beat frequency of an object at each increment will be single and can be counted by a frequency counter. In this way, a beat frequency of higher than a maximum beat frequency will be filtered out thereby improving the accuracy of the object detection for objects less than the maximum distance away via the frequency counter. In some embodiments, the cutoff frequency of the filter can be dynamically set based on the segmentation of the FOV determined by the time period $t_d$.

In an embodiment, the controller circuit 180 may perform an FFT analysis with an analog-to-digital converter (ADC) can be used to detect or identify objects at positions greater than the maximum distance $R_{max}$. As indicated above, light reflected from an object at a distance greater than the maximum distance $R_{max}$ can be detected by a detector of the system through the same optical path including the wavelength dispersive element 620, but the light will not be correctly detected with a frequency counter due to multiple light signals due to multiple light signal in one segment or period (e.g., such as the third and fourth signals 653 and 654). However, in an embodiment, the controller circuit 180 may utilize an ADC circuit to detect multiple returned object signals in a segment or period and compute positions of all of the objects related to the reflected object signals. For example, multiple peaks can be detected in the FFT signals and the corresponding distances for each peak can be identified based on the location of the peaks in the FFT.

Figure 7:
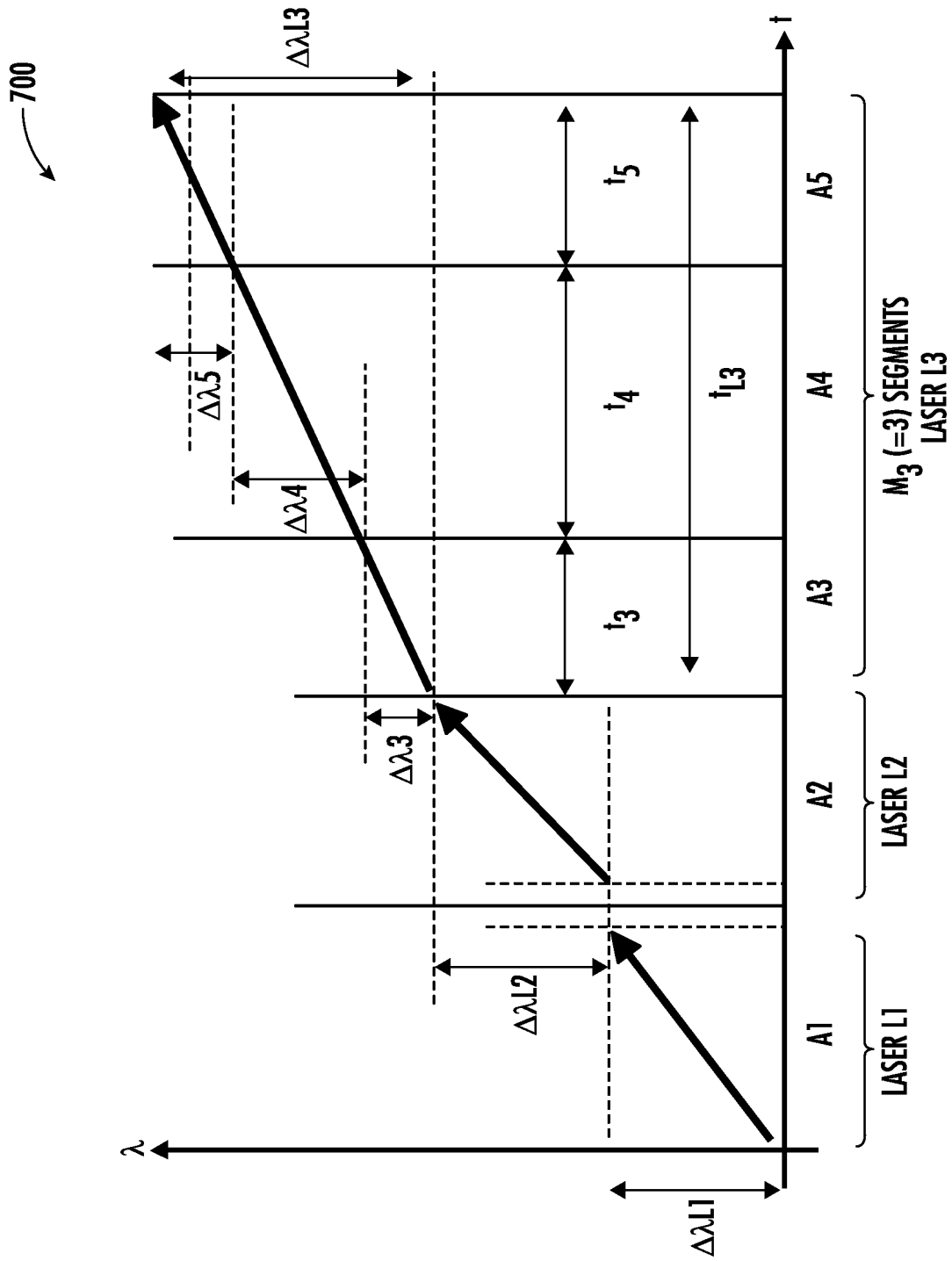
FIG. 7 depicts a graph of a signal profile of a light source in accordance with an illustrative embodiment.

Referring to FIG. 7, a signal graph 700 of a light source 101 is depicted. In some embodiments, the light source 101 may include multiple tunable lasers cascaded together. In some embodiments, each of the multiple tunable lasers may have different sweep rates and/or bandwidths. The beams of each of the multiple tunable lasers can be coupled together into a single path to act as the light source 101. For example, the signal graph 700 depicts a first beam 701 from a first tunable laser $L_1$, a second beam 702 from a second tunable laser $L_2$, and third beam 703 from a third tunable laser $L_3$. In some embodiments, each tunable laser can cover the frequency sweep range over various segments $M_1$. For example, the first beam 701 covers a first segment $A_1$, the second beam 702 covers a second segment $A_2$, and the third beam 703 covers three segments $A_{3-5}$. Moreover, each tunable laser $L_i$ can have different tuning ranges $\Delta\lambda_{Li}$ and respective time periods $t_{Li}$ with the different frequency sweep slope. In some embodiments, the overall frequency sweeps with multiple tunable lasers can be done continuously or discretely. In some embodiments, there can be a gap between adjacent segments (e.g., $A_1$ and $A_2$) or overlap between adjacent segments. The use of multiple tunable lasers ensures that a scan over the maximum possible frequencies and thereby the respective extrema of angles in the external environment can be achieved. Moreover, the different sweep rates, bandwidths, and overlaps of the tunable lasers allow the LIDAR system to particular patterns of the external environment that can be selected based on the particular application of the LIDAR system, which may improve object detection or resolution in important regions (e.g., regions of interest) of the FOV as described in reference to FIGS. 8a and 8b.

Figure 8A:
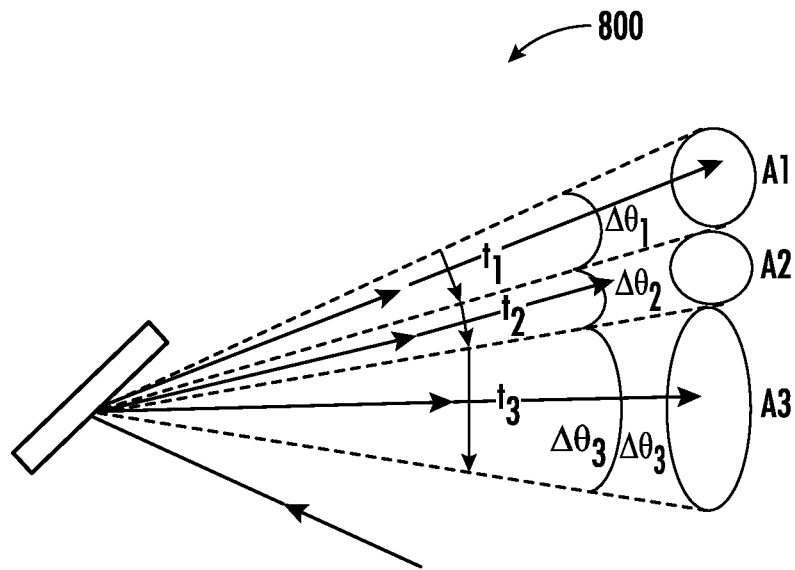
FIGS. 8a and 8b depict examples of variable density scans of a LIDAR system in accordance with an illustrative embodiment.
Figure 8B:
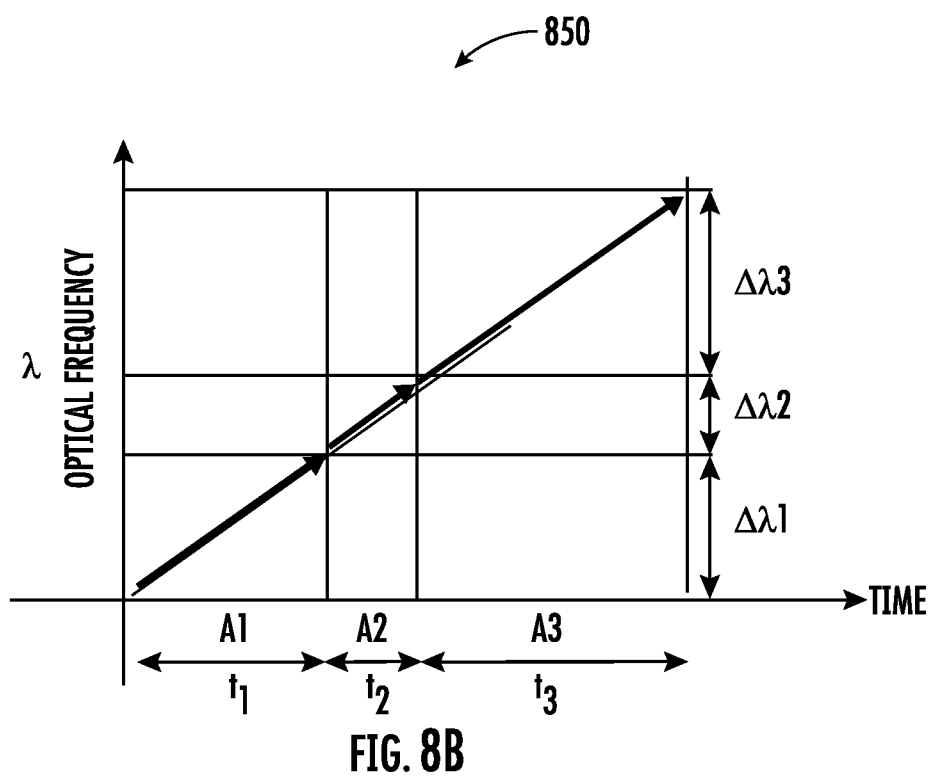

FIGS. 8a and 8b depict an example of variable density scanning. FIG. 8a depicts an example of a two dimensional scan 800 of the external environment. FIG. 8b depicts an example of a frequency sweep 850 from the light source for the two dimensional scan. A first time period $t_1$ of the scan corresponds to a first segment $A_1$ of the external environment, a second time period $t_2$ of the scan corresponds to a second segment $A_2$ of the external environment, and a third time period $t_3$ corresponds to a third segment $A_3$ of the external environment. In an embodiment, every segment $A_i$ may have the same time period $t_i$ and the same frequency bandwidth $\Delta\lambda_i$. In some embodiments, depth or length resolution can be determined by the bandwidth $\Delta\lambda_i$. The resolution is proportional to $\lambda^2/\Delta\lambda_i$ or the wavelength divided by the frequency bandwidth of the respective tunable laser. For example, each time period time period $t_i$ at a segment $A_i$ can be variable such that each scanning angle range $\Delta\theta_i$ can also be variable. Accordingly, the density or resolution of scanning can be controlled by the controller circuit 180.

Figure 9B:
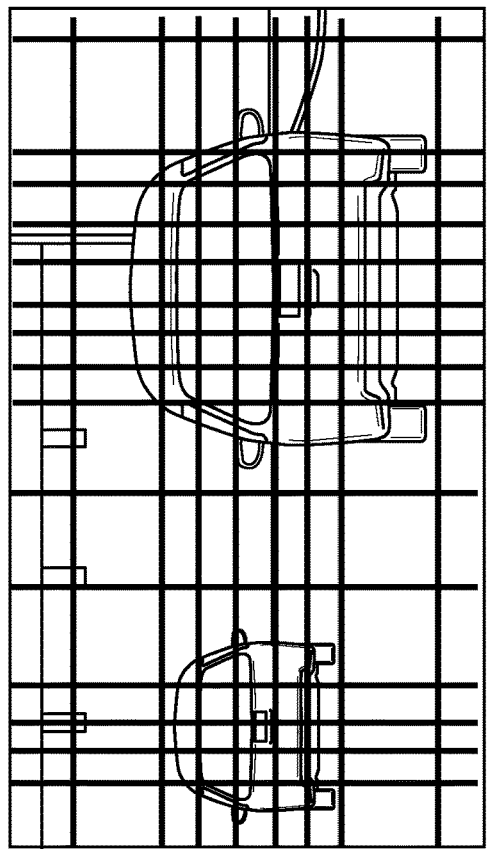
FIGS. 9a and 9b depict examples of two dimensional scans of the external environment in accordance with an illustrative embodiment.
Figure 9A:
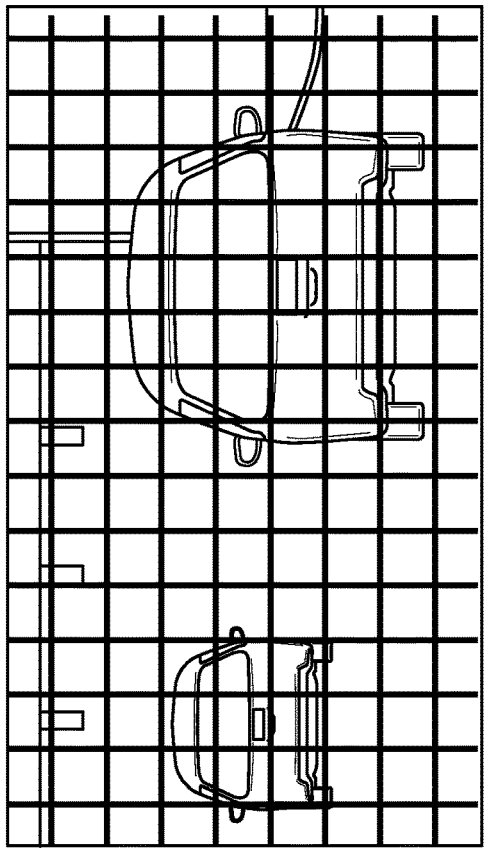

FIGS. 9a and 9b depict examples of three dimensional scans of the external environment. As explained in reference to FIGS. 8a and 8b, the scans of the external environment can be segmented. Accordingly, the controller circuit 180 can increase the density of segments around a region of interest (ROI). The segmentation and/or the ROI may be determined after a first constant density sweep or scan 900 of the FOV. In some embodiments, the segmentation and/or the ROI may be determined based on information from other sensors such as cameras or Radar sensors. In some embodiments, the ROI or segmentation may be based on the detection of an object within a predefined range. After determining the ROI, the LIDAR system may determine a particular segmentation and perform additional sweeps with the determined segmentation 950. In some embodiments, the LIDAR system may dynamically adjust the segmentation for each sweep or scan based on a pre-defined set of rules that define what or where the ROI is based on the sensor data.

That is, in some embodiments, the segmentation may be varied at each frame (e.g., scan of the FOV). In some embodiments, different segmentation may be applied to the same frame (e.g., data from a scan) when the frame is analyzed multiple times.

Figure 10:
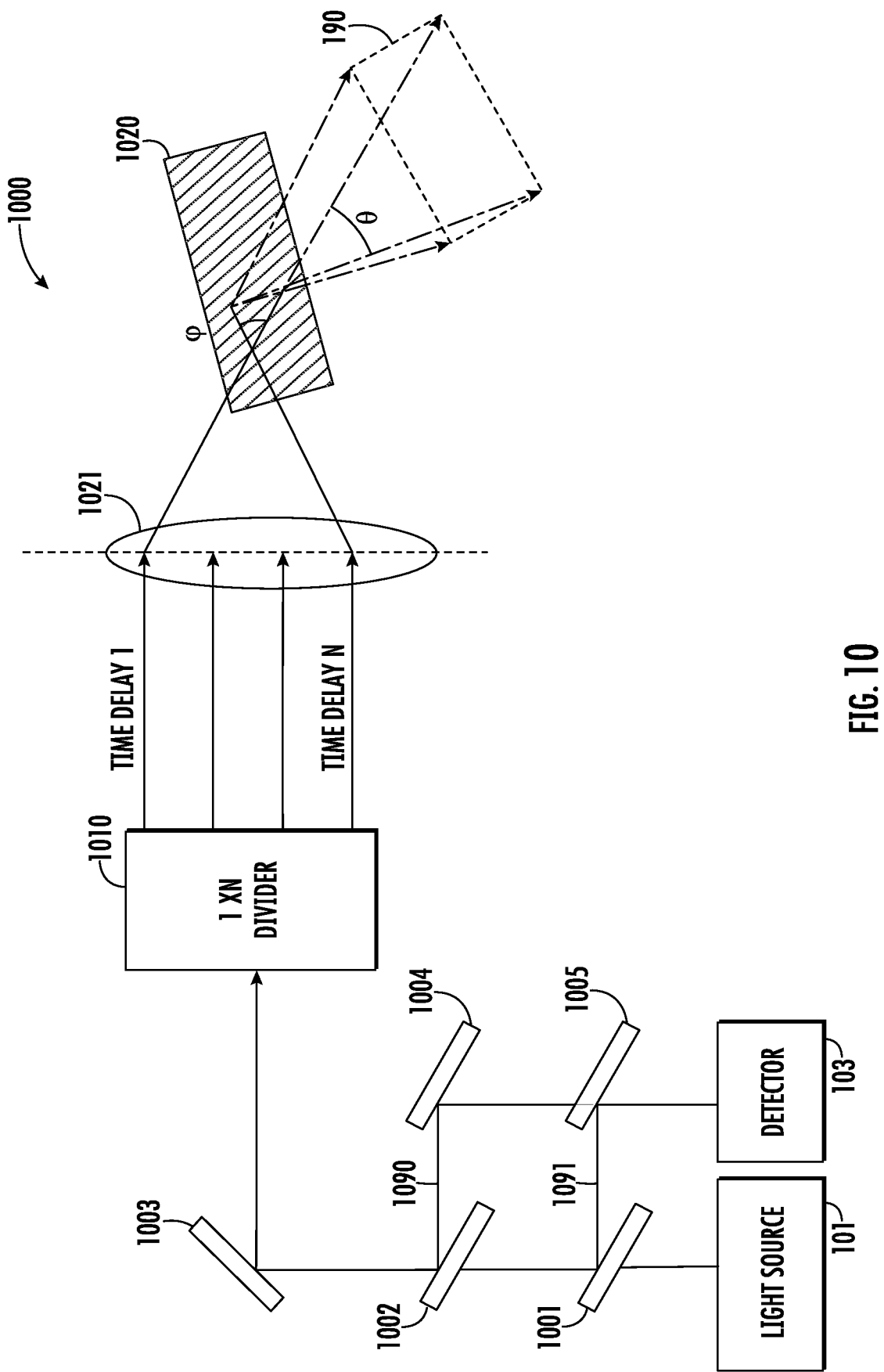
FIG. 10 depicts an example of a LIDAR system having a 1×N divider in accordance with an illustrative embodiment.

FIG. 10 depicts an example of a LIDAR system 1000 having a 1×N divider 1010. The LIDAR system 1000 includes a light source 101 that is arranged to project a beam into the input of the 1×N divider 1010. In an embodiment, the beam is directed to a first optical element 1001, a second optical element 1002, a third optical element 1003 and into the input of the 1×N divider 1010. In some embodiments, the 1×N divider is coupled to and controlled by the controller circuit 180. For example, the controller circuit 180 may determine which output of the N outputs that an input beam is directed to. The beam is directed out of one of the N outputs and directed through a fourth optical element 1021 onto a wavelength dispersive element 1020 that disperses the beam into the external environment. In this arrangement, the N number of outputs each direct light to a respective portion of the wavelength dispersive element 1020 with a respective incidence angle that allows the LIDAR system 1000 to make scans in the second angle φ. Reflected portions of the beam 1090 may be directed back to the second optical element 1002 to a fifth optical element 1005. The fifth optical element 1005 may direct the reflected portions of the beam to a sixth optical element 1006 that is configured to combine the reflected portion of the beam 1090 with a reference portion of the beam 1091 and direct the combined beams to the detector 103.

In some embodiments, each path from the input to the respective N outputs of the 1×N divider 1010 may have a different optical delay. Accordingly, the beam from the light source 101 may be projected to the 1×N divider and output at each of the N outputs over a scan or sweep. Each signal for each beam emitted from the respective N outputs can be distinguished with a single detector 103 because of the respective optical delays. As such, the 1×N divider is structured such that each path from the input to the respective N outputs includes an optical delay (e.g., distances) that is different than the other paths (e.g., and large enough relative to the frequency scanning time). In some embodiments, the optical frequency of the beam from the light source 101 may be scanned at once over the whole scan range along the first angle θ. Alternatively or additionally, the optical frequency of the beam may be scanned at segments to get the signals from all of the N beams at the respective segments. In this example, the tuning range at each segment width may be the same, but the offset optical frequency at each segment differs to steer the beam along the first axis to generate a scan over the whole scan range.

Figure 11A:
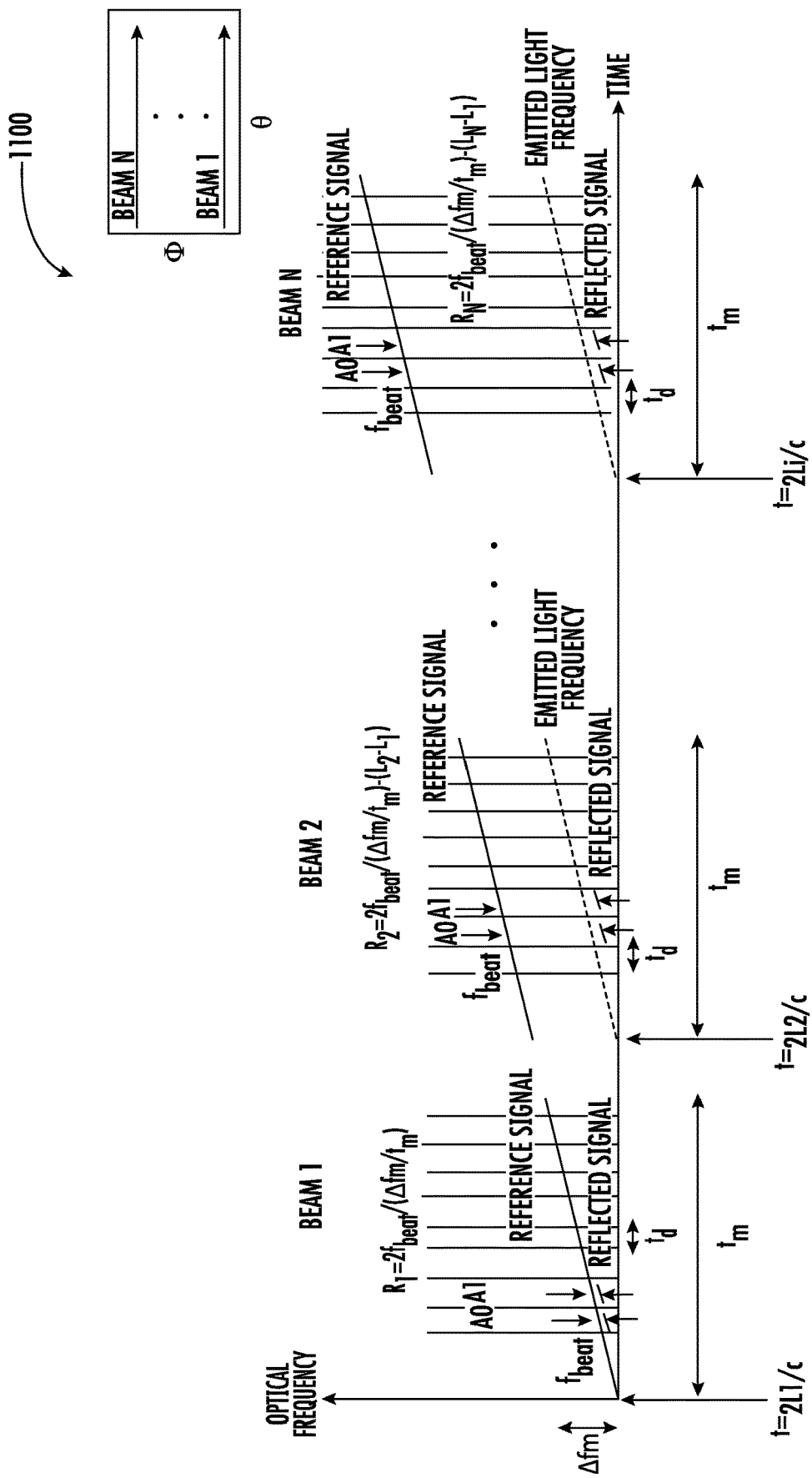
FIGS. 11a-11c depict examples of various detection scans using a LIDAR system in accordance with an illustrative embodiment.
Figure 11B:
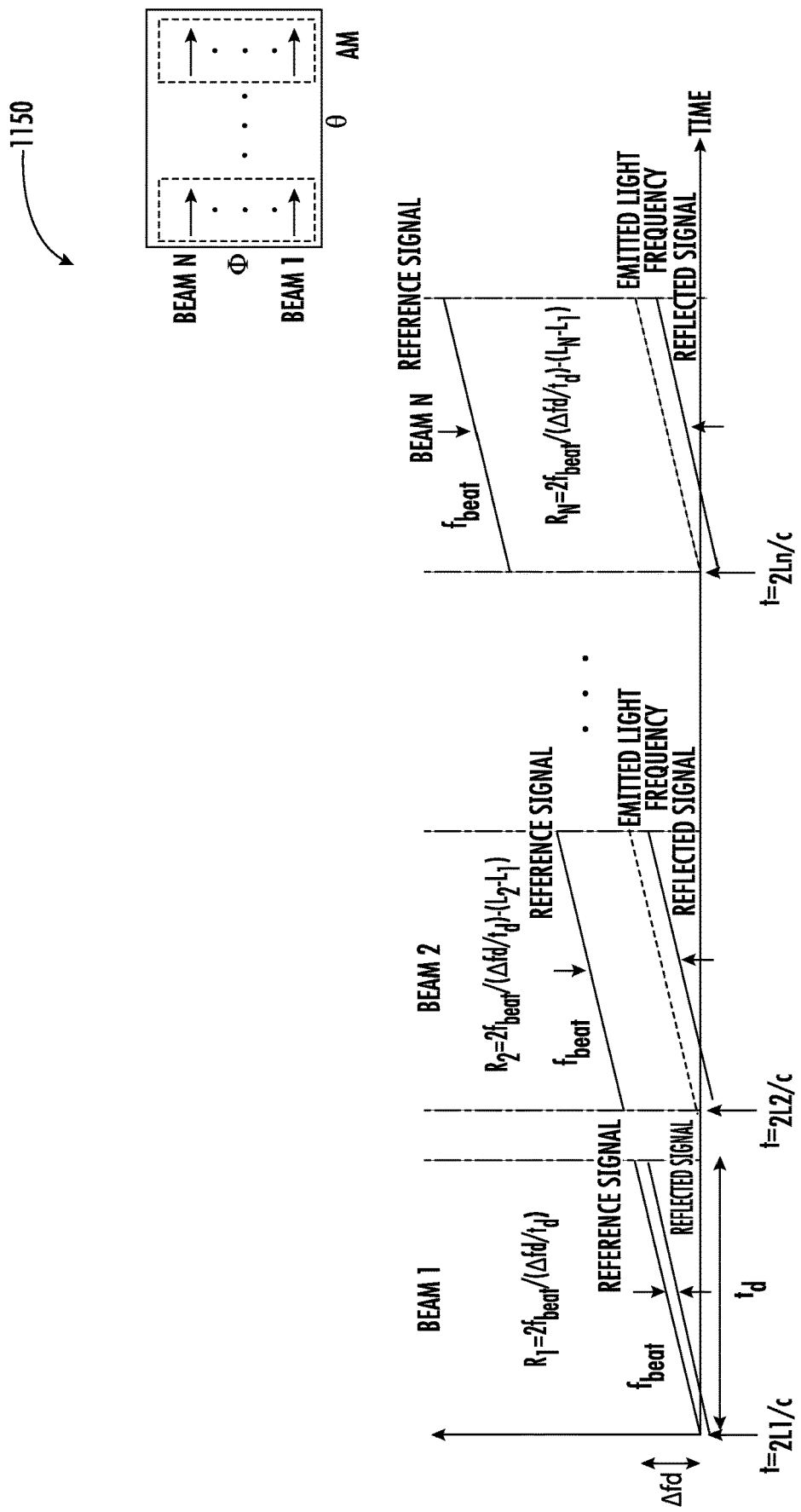
Figure 11C:
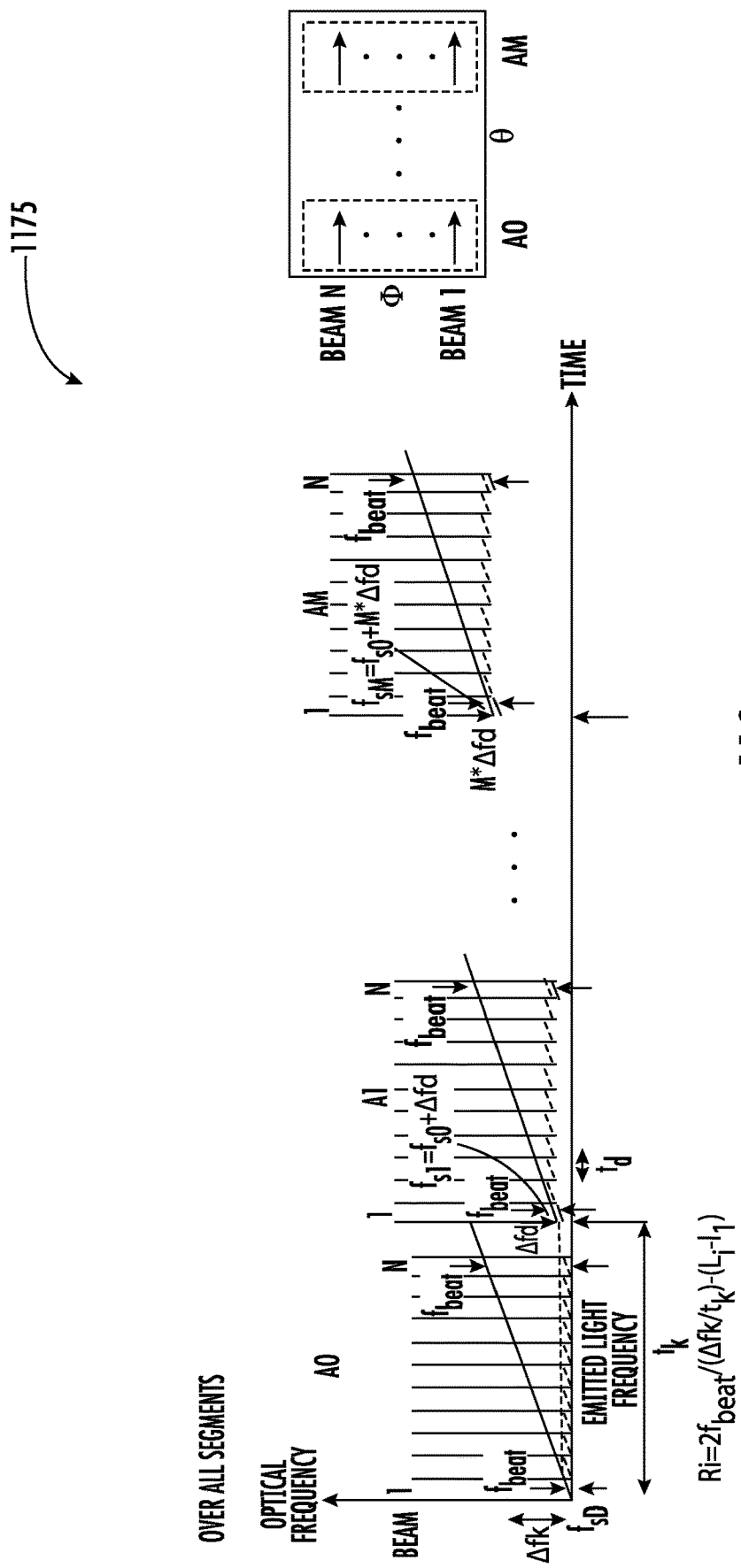

Referring to FIGS. 11a-11c, examples of various detection scans are depicted. FIG. 11a depicts an example of a signal graph 1100 the LIDAR system 1000 scanned continuously along the first angle θ over the whole scan range. FIGS. 11b-11c depict an example of the beam being scanned at each segment along the first angle θ. In some embodiments, the tuning range or frequency change for each segment can be the same. For example, in FIGS. 11b-11c the offset frequency is at each segment is set based on the segment being measured, and a scan over a subset of frequencies is made to measure each segment along the first angle θ.

Referring generally to FIG. 11a, the signal graph 1100 includes a depiction of a first beam (e.g., Beam 1) corresponding to a first path of the N paths of the 1×N divider 1010, a second beam (e.g., Beam 2) corresponding to a second path of the N paths of the 1×N divider 1010, and an N beam (Beam N) corresponding to a last of N paths. In this example, the beam from the light source 101 was swept continuously over the full range of frequencies from the first extrema to the last extrema. As can be seen the optical delay $$\frac{2L_i}{c}$$

of each beam allows the processor 181 to determine which beat signals correspond to the particular beams and allow the processor to calculate the position of objects within the FOV. The processor 181 may then, for each segment and beam, may calculate the distances or ranges of targets corresponding to the beat or reflected signals using the equations $R_1$, $R_2$, $R_N$.

Referring generally to FIG. 11b, a first signal graph 1150 includes a depiction of a first beam (e.g., Beam 1) corresponding to a first path of the N paths of the 1×N divider 1010 during a first segment $A_0$, a second beam (e.g., Beam 2) corresponding to a second path of the N paths of the 1×N divider 1010 during the first segment $A_0$, and an N beam (Beam N) corresponding to a last of N paths during the first segment $A_0$. In this example, the beam from the light source 101 was swept continuously from an offset frequency corresponding the beginning of the first segment to a final frequency corresponding to the last frequency of the first segment. As can be seen the optical delay $$\frac{2L_i}{c}$$

of each beam allows the processor 181 to determine which beat signals correspond to the particular beams and allow the processor to calculate the position of objects within the FOV. In particular, when the delays $L_i$ are smaller than the delay of the adjacent path and $2*(L_{i+1}-L_i)$ divided by the speed of light is greater than the time $t_d$ of the sweep for the segment, then each beam can be emitted at a different time without any overlap, which ensures there are no overlapping object or beat signals. The processor 181 may then, for each segment and beam, may calculate the distances or range of a target using the equations $R_1$, $R_2$, $R_N$.

Referring generally to FIG. 11c, a second signal graph 1175 depicts a signal of a first beam (e.g., Beam 1) over multiple different segments $A_0$, $A_1$, $A_M$ as the processor 181 scans segment by segment. The duration time $t_k$ for each segment $A_i$ is equal to or longer than the frequency scan duration time for all beams N. That is, $$t_k > 2 * \left(\frac{L_N - L_1}{c}\right) + t_d.$$

Moreover, the $i^{th}$ frequency scan for a segment $A_i$ starts at a frequency of $f_{si}=f_{s0}+i*\Delta fd$. In this way, the beam may be continuously directed throughout the first angle θ of the external environment without gaps.

Figure 12:
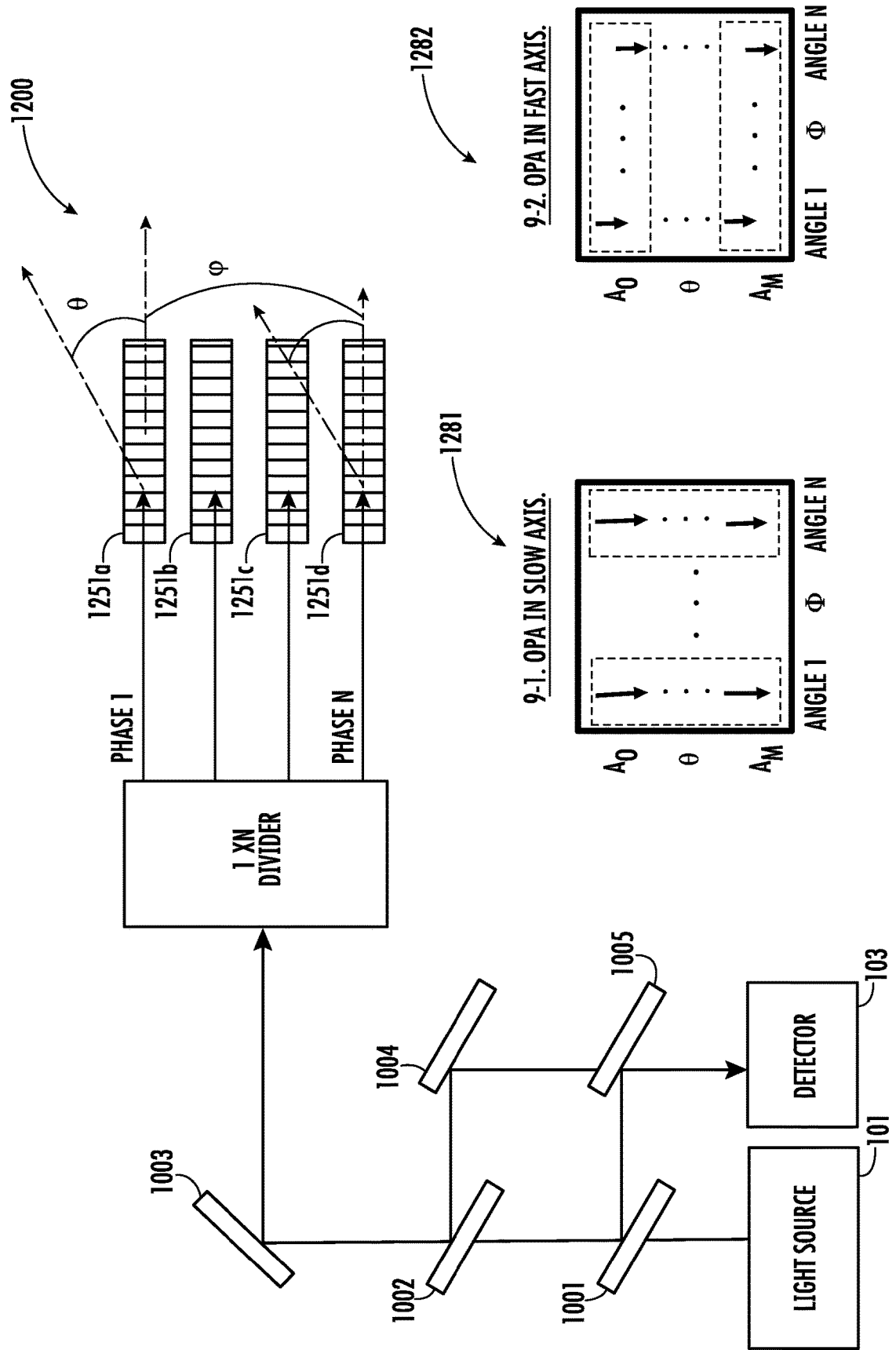
FIG. 12 depicts a second example of a LIDAR having a 1×N divider in accordance with an illustrative embodiment.

Referring to FIG. 12, an example of a LIDAR system 1200 having a 1×N divider 1210 is depicted. The LIDAR system 1200 may be similar to the LIDAR system 1000. However, the LIDAR system 1200 includes multiple wavelength dispersive elements 1251a-d, where each of the multiple wavelength dispersive elements 1251a-d is positioned to receive an output beam from a respective output of the 1×N divider. In this way, the LIDAR system 1200 may be steered along the first angle θ of the external environment via wavelength tuning of the beam and steered along the second angle of the φ of the external environment by controlling the phase of light that reaches the respective wavelength dispersive element 1251*a-d* (e.g., an optical phased array). That is, each path of the 1×N divider may include or act as a phase shifter as used for optical phased arrays. The distance or range of the objects at each beam emission angle can be calculated during the wavelength tuning to generate a three-dimensional image of the FOV.

In a first example 1281, the optical phased array (OPA) is steered in the slow axis. In this example, the wavelength tuning is done over pre-defined M segments for N times to achieve two-dimensional beam steering. The beam is steered by OPA along the slow axis at N discrete points using N wavelength dispersive elements 1251*a-d*.

In a second example 1282, the OPA is steered in the fast axis. That is, in various embodiments, a two-dimensional scan of the environment (e.g., FOV) may be accomplished via multiple beam scans along the fast axis during a single beam scan along the slow axis. In the first example 1281, the second angle φ corresponds to the slow axis. In the second example 1282, the second angle corresponds to the fast axis. In this example 1282, the beam is steered at N discrete points by OPA along the second angle φ during each segment $A_i$ and the beam is also steered along the first angle θ depending on the wavelength. In this example, the two dimensional beam steering may be done during a single tuning of the beam.

Figure 13:
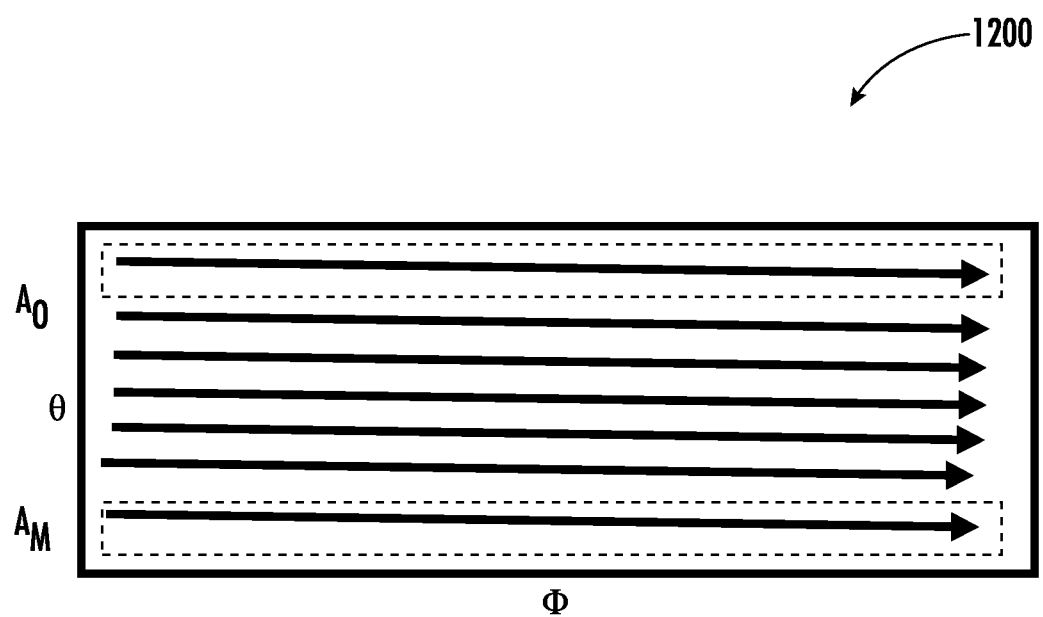
FIG. 13 depicts an example of a detection scan using the LIDAR system of FIG. 12 in accordance with an illustrative embodiment.

Referring to FIG. 13, an example of a detection scan 1200 using the LIDAR system 1200 is depicted. In this example, the beam is steered along both the first angle θ and the second angle φ using wavelength tuning. The phase difference between the beams at adjacent wavelength dispersive elements 1251*a-d* can be determined by the optical path delay. The phase of each path for the respective 1×N divider paths is given by equation 1:

$$\Psi = \Delta L * 2\pi n(\lambda)/\lambda \quad (1)$$

In equation (1), λ is the beam wavelength and n is the refractive index of the respective wavelength dispersive element 1251*a-d*. As the wavelength is tuned by the light source 101, the beam is steered along both the first angle θ and the second angle φ. The distance of objects at each beam emission angle can be calculated during the wavelength tuning. As can be seen in the example of the detection scan 1200, as the wavelength of the beam is tuned in the segment $A_0$, the beam is steered along the second angle φ continuously. The distance may be calculated at each beam steering angle. During this beam steering, the beam is also steered along the first angle θ. In this way, the FOV may be scanned via a single wavelength tuning.

Figure 14A:
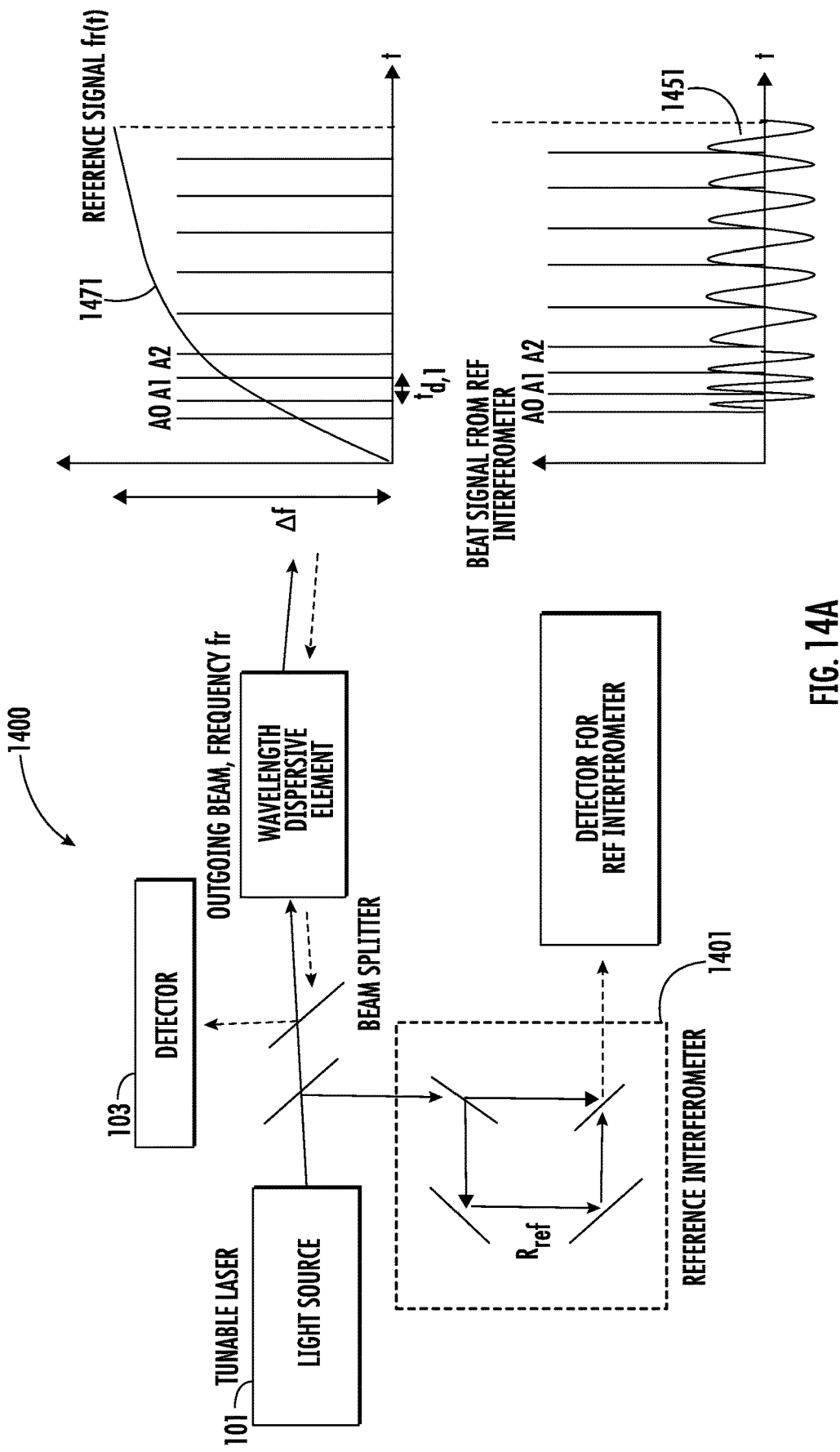
FIG. 14a depicts an example of resampling using a reference interferometer in accordance with an illustrative embodiment.

Referring to FIG. 14*a*, an example of resampling using a reference interferometer is depicted. In an embodiment, a LIDAR system 1400 may include a reference interferometer 1401 positioned such that a portion of the beam from the light source 101 is received by the reference interferometer. In some embodiments, the portion of the beam from the light source 101 is directed toward the reference interferometer 1401 via a beam splitter 1401. In some embodiments, the reference interferometer 1401 may be a Mach-Zehnder interferometer. The reference interferometer 1401 may be used to generate a beat signal 1451 that corresponds to a reference signal 1471 of the beam over a sweep of the light source. The reference interferometer may be used to identify the segments in the external environment even when the frequency sweep (e.g., scan or tuning) is non-linear or where the time period at each segment is not identical. The reference interferometer signals (e.g., the beat signal 1451) may be used to compensate for the nonlinearity of the signals collected by the detector 103 and/or the signals of the light source 101.

For example, the reference signal 1471 may non-linear intentionally or non-intentionally due to constraints of the light source 101. The non-linearity of the reference signal 1471 may distort the amount of time that the beam is directed toward particular portions of the FOV (e.g., such as segments A0, A1, or A2). As a result, calculations of object signal positions and object signal size may also be distorted. In order for the LIDAR system 1400 (e.g., controller circuit 180) to correct for the distortions while calculating the range and velocity of one or more objects in the FOV, the beat signal 1451 may be used as a reference. For example, the beat signal 1451 that indicates the time that the object beam is swept passed each portion (e.g., A0, A1, and A2) of the FOV. In some embodiments, the beat signal 1451 may indicate the time and angular position of the object beam by creating a cosine graph where each cycle of the cosine is related to one portion of the FOV. As such, the beat signal 1451 from the reference interferometer 1403 may be used to identify the segments that the beam 1471 is projected toward or swept over particular portions of the FOV even if there is non-linearity in the reference signal. Further, the beat signal 1451 may also be used to identify the time that ramp up and ramp down regions of a frame occur even if they are also non-identical. In other words, the beat signal 1451 may be used by the processor 182 to compensate the non-linearity of the frequency sweep and ensure that accurate positions, distances, and velocities are measured for each object in the FOV. In some embodiments, the LIDAR system 1400 may calculate and compensate for non-linearity of the reference signal 1471 by detecting (e.g., via the interferometer) the reference signal 1451 and recording the times that the reference beam 1471 is at particular frequencies and cross referencing received object signals based on the recording.

Figure 14B:
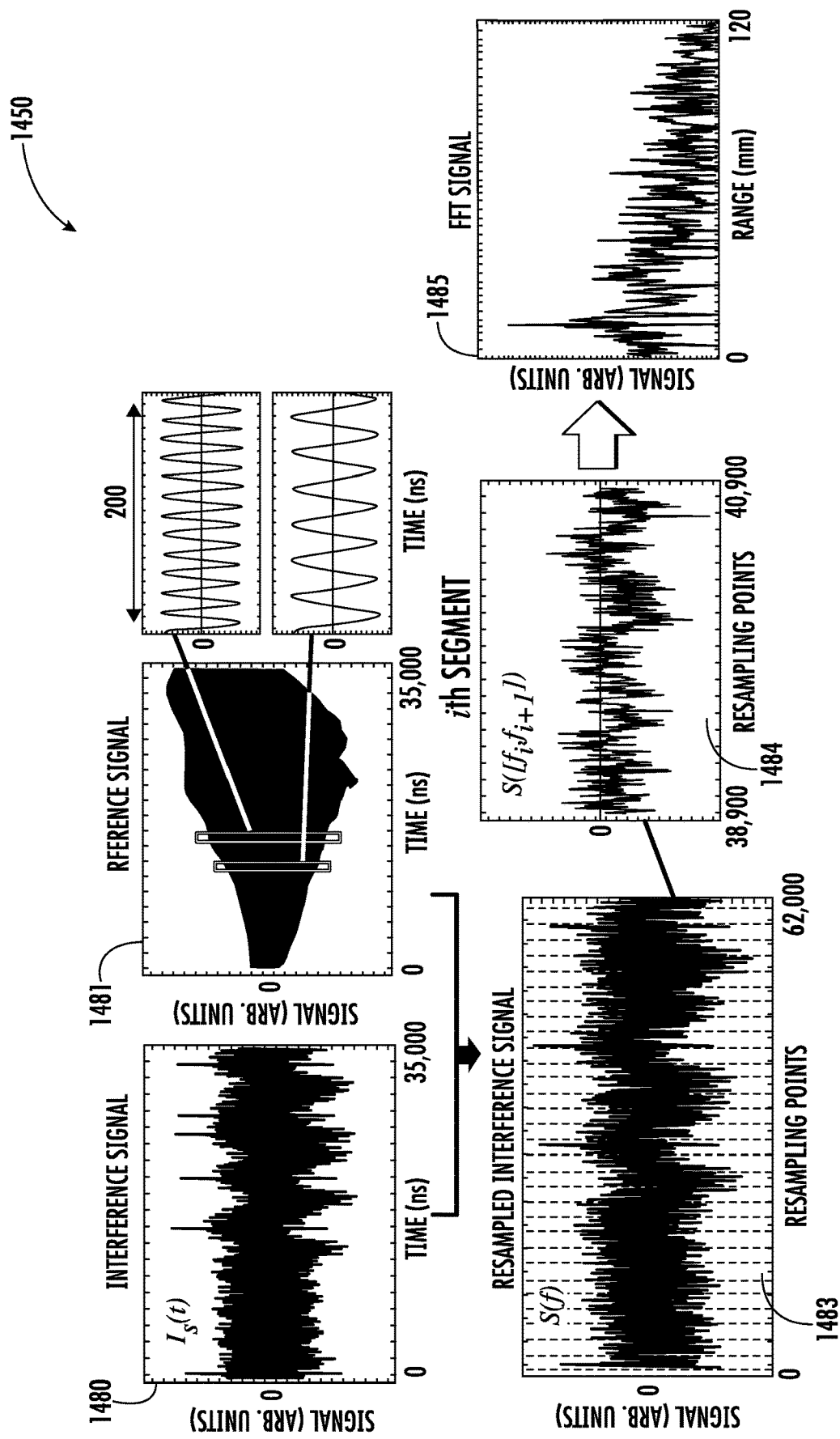
FIG. 14b depicts an example of segmentation of an interference signal collected by the detector using the reference signal from the reference interferometer in accordance with an illustrative embodiment.

Referring to FIG. 14*b*, an example of segmentation 1450 of an interference signal 1480 collected by the detector 103 using the reference signal 1481 from the reference interferometer 1481 is depicted. The interference signal 1480 can be rescaled to the frequency domain with constant frequency intervals using the corresponding reference signal 1481 to generate a resampled interference signal 1483. Each segment, such as the segment signal 1484, of the resampled interference signal 1483 can be parsed from the resampled interference signal 1483. In some embodiments, a range of the objects in each respective segment is calculated or determined using a frequency counter. In some embodiments, the range of the objects in each respective segment is determined based on a generated FFT signal 1485 of the segment. It is to be appreciated that the resampling of the interference signal 1480 may be done either before, in the middle, or after segmentation of the interference signal 1480.

Figure 15:
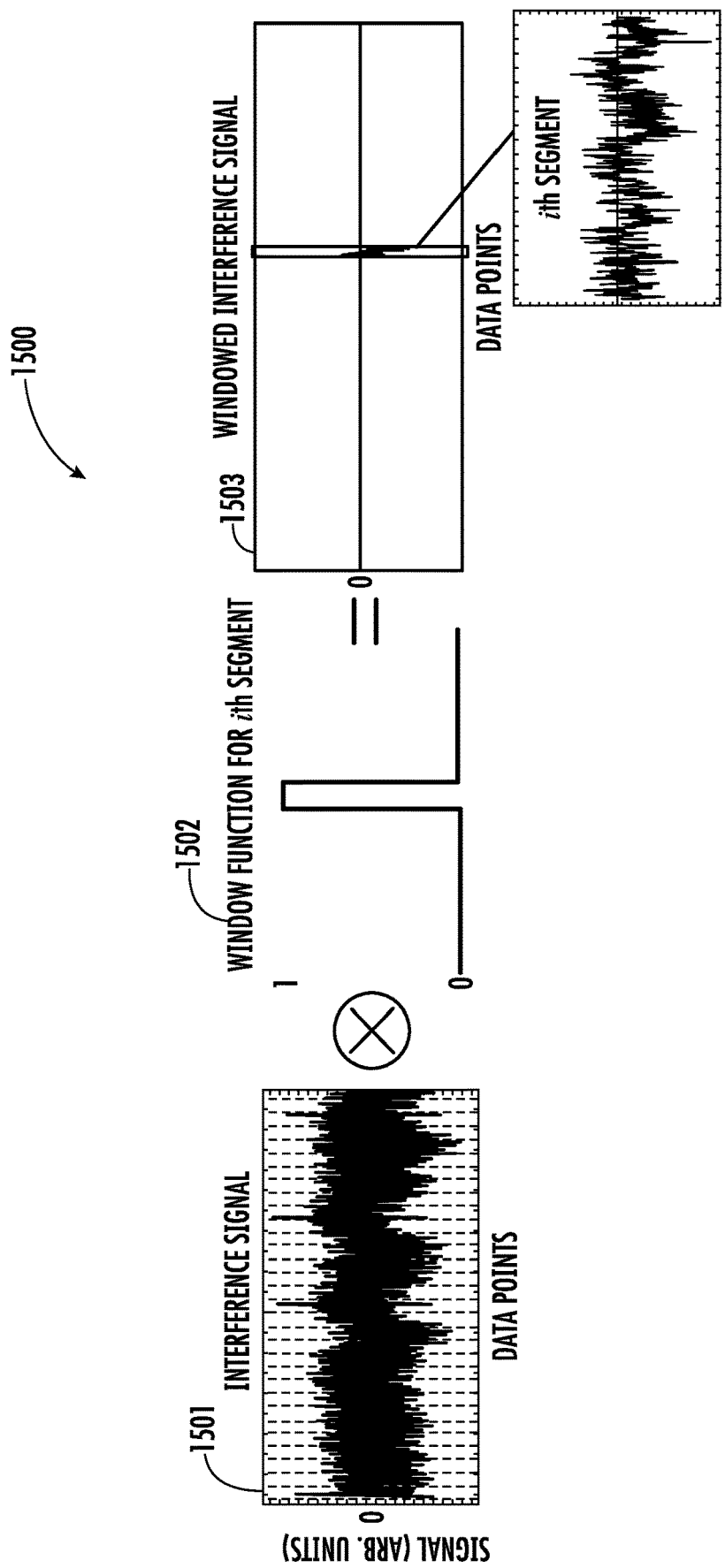
FIG. 15 depicts an example of segmentation of signals using window functions in accordance with an illustrative embodiment.

Referring to FIG. 15, an example of segmentation 1500 of signals using window functions is depicted. That is, the segmentation of an interference signal 1501 may be done using window functions. For example, a window function 1502 for a particular segment can be determined and used by the controller circuit 180. The window function 1501 for the particular segment of the external environment is convolved with the interference signal 1501 to generate a windowed interference signal 1503. In some embodiments, the windowed interference signal 1503 may then be used to generate an FFT for calculating the range of objects corresponding to the particular segment. In some embodiments, the window function 1502 may include a Gaussian window, a Hann window, and/or a rectangular window. In various embodiments, window functions 1502 for adjacent segments may be overlapped or include a gap depending on whether the controller circuit 180 has determined the particular segments to be an ROI.

Figure 16:
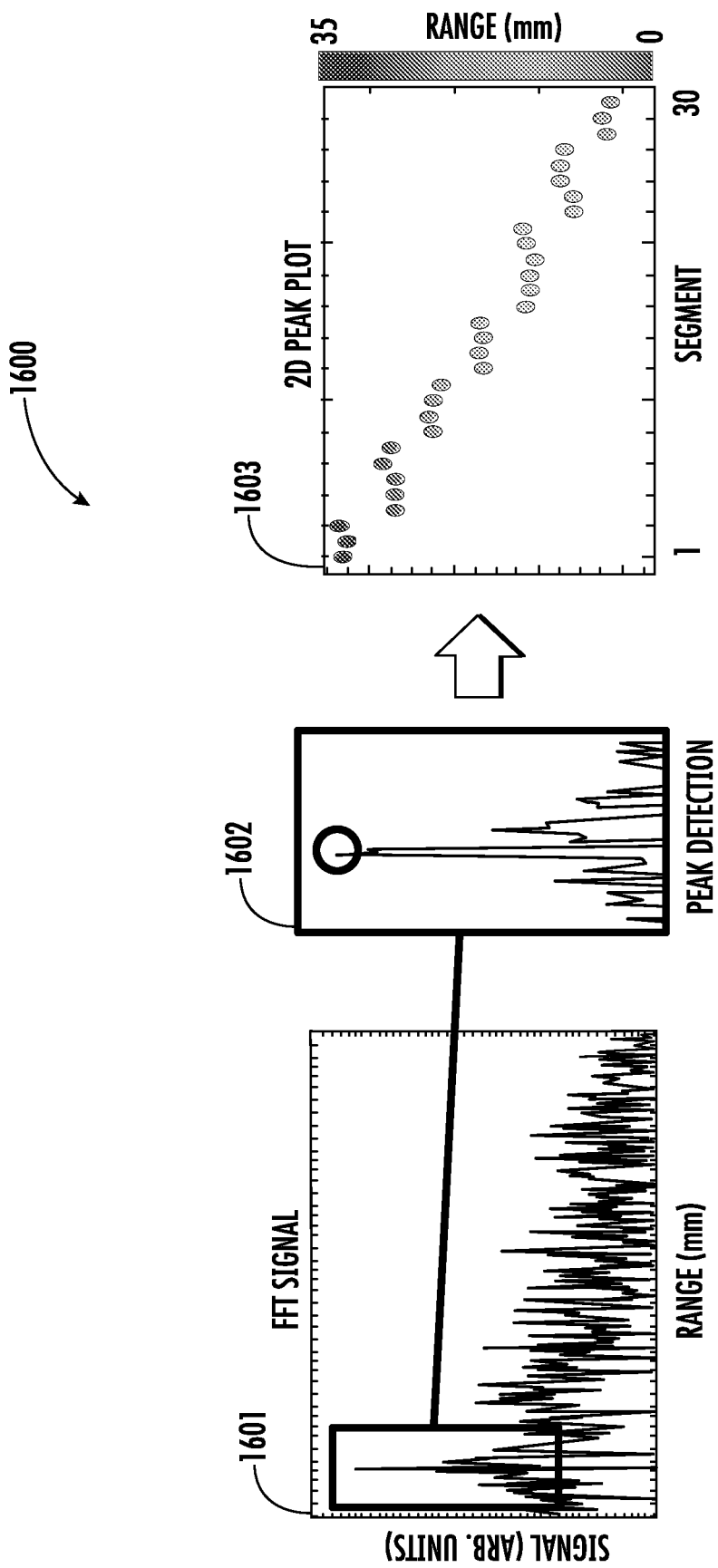
FIG. 16 depicts an example of LIDAR data generation from FFT data in accordance with an illustrative embodiment.

Referring to FIG. 16, an example of LIDAR data generation 1600 from FFT data is depicted. For example, after segmentation of the interference signal (such as interference signal 1501), an FFT 1601 of the segmented interference signal may be generated by the controller circuit 180. The controller circuit 180 may then detect or determine peaks within the FFT 1601 (e.g., or multiple FFTs corresponding to each segment) and generate a density plot 1603 (e.g., a two-dimensional peak plot). As such, the controller circuit 180 is able to generate a density plot for the FOV using the FFT signals obtained from the interference signals detected or collected during the scan of the FOV. In some embodiments, the peak is detected in the FFT signal 1601 via a maximum signal detection algorithm, theoretical fitting such as Gaussian fitting, and/or other estimation algorithms.

Figure 17A:
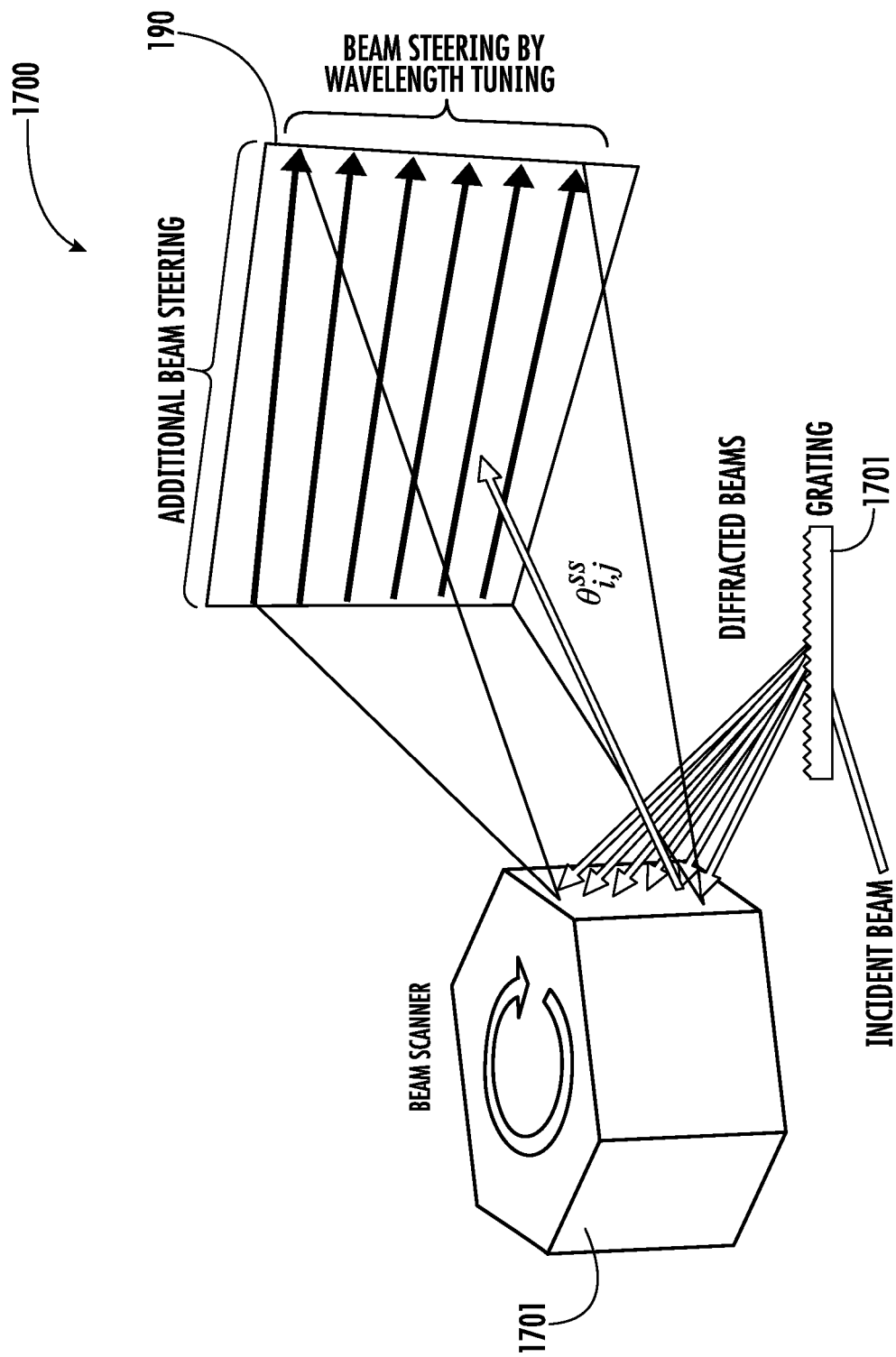
FIGS. 17a-e depict examples of LIDAR scanning using a beam scanner in accordance with an illustrative embodiment.

Referring to FIG. 17a-e, examples of LIDAR scanning using a beam scanner are depicted. FIG. 17a depicts an optical beam steering device 1700 including a beam scanner 1701 and a wavelength dispersive element 1702. For example, an incoming beam is directed onto the wavelength dispersive element 1702 and toward a reflective beam scanner 1701. The beam scanner 1701 is rotatable (e.g., connected to an actuator) about an axis and is able to steer the beam about an angle (e.g., the first angle θ or the second angle φ) into the external environment. The tuning of the beam allows for the beam to be steered into the external environment about a second angle. In some embodiments, the beam scanner 1701 is a mirror, polygon, or other shape with a reflective coating.

Figure 17B:
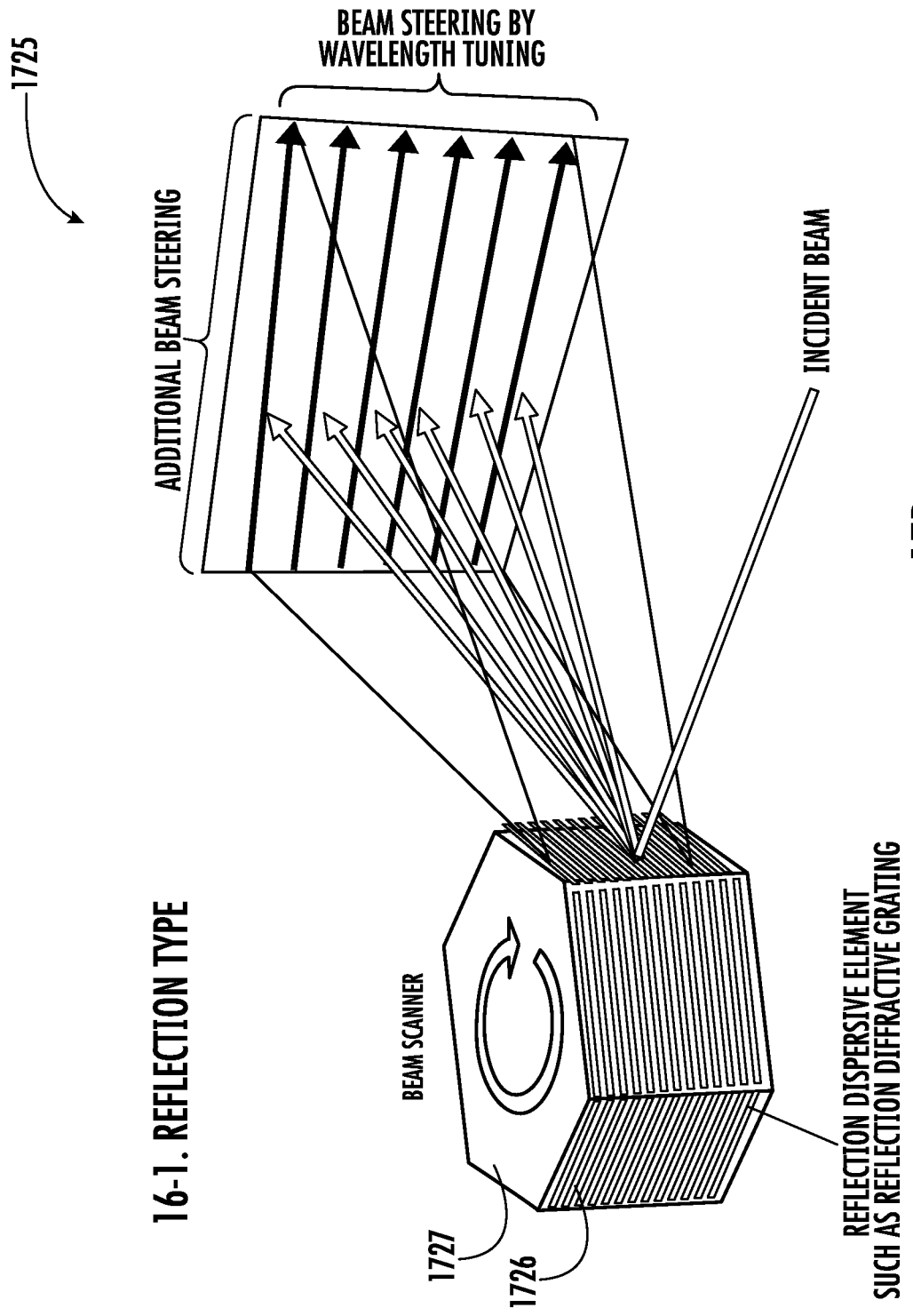

FIG. 17b depicts an optical beam steering device 1725 including a wavelength dispersive element 1726 disposed on a beam scanner 1727. An incident beam is directed to the wavelength dispersive element 1726 disposed on a beam scanner 1727. The beam scanner 1727 may be rotatable (e.g., connected to an actuator) about an axis and is able to steer the beam about an angle (e.g., the first angle θ or the second angle φ) into the external environment. The tuning of the beam allows for the beam to be steered into the external environment about a second angle. In some embodiments, the beam scanner 1727 is a mirror, polygon, or other shape with a coating that allows for gratings to be disposed thereon.

Figure 17C:
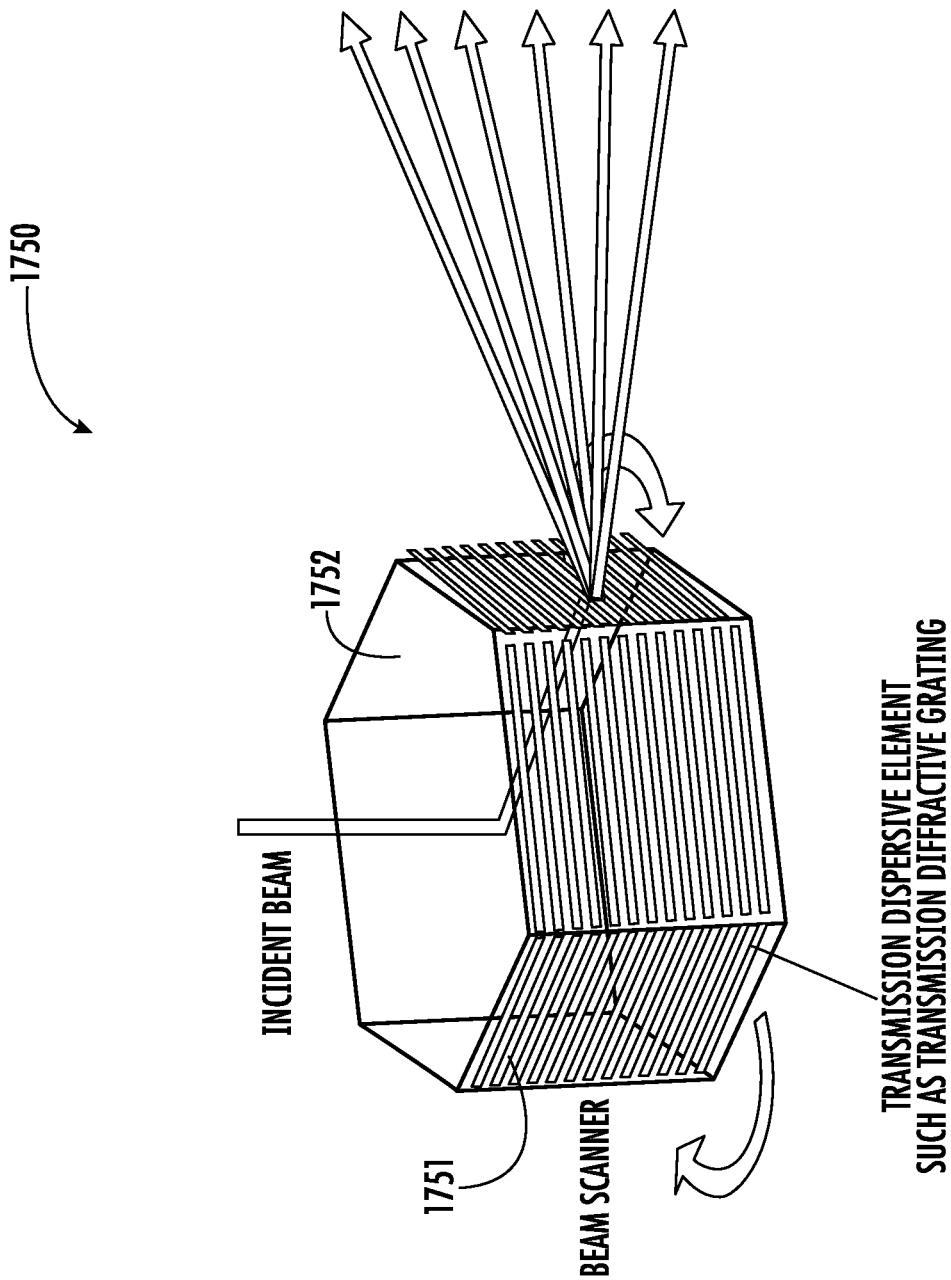

FIG. 17c depicts an optical beam steering device 1750 including a wavelength dispersive element 1751 disposed on a transmissive beam scanner 1752. An incident beam is directed into the beam scanner 1727 that directs the incident beam out of a side through a wavelength dispersive element 1751 disposed on the side. The beam scanner 1727 may be rotatable (e.g., connected to an actuator) about an axis and is able to steer the beam about an angle (e.g., the first angle θ or the second angle φ) into the external environment. The tuning of the beam allows for the beam to be steered into the external environment about a second angle. In some embodiments, the beam scanner 1752 is a polygon, or other shape. In some embodiments, the beam scanner 1752 is made from glass, fiber, or a polymer that allows for the beam to pass through.

Figure 17E:
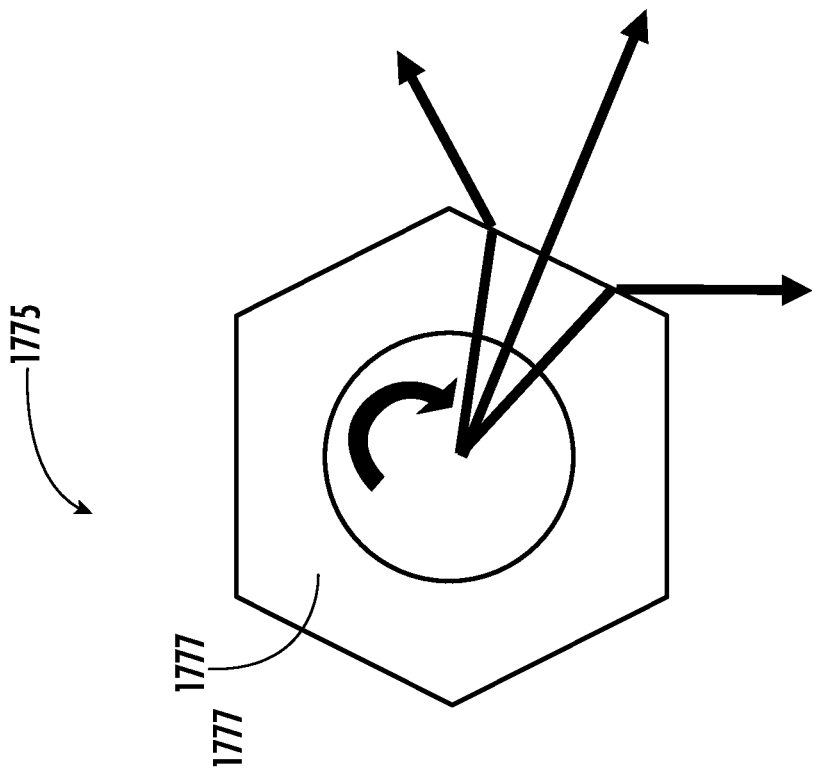
Figure 17D:
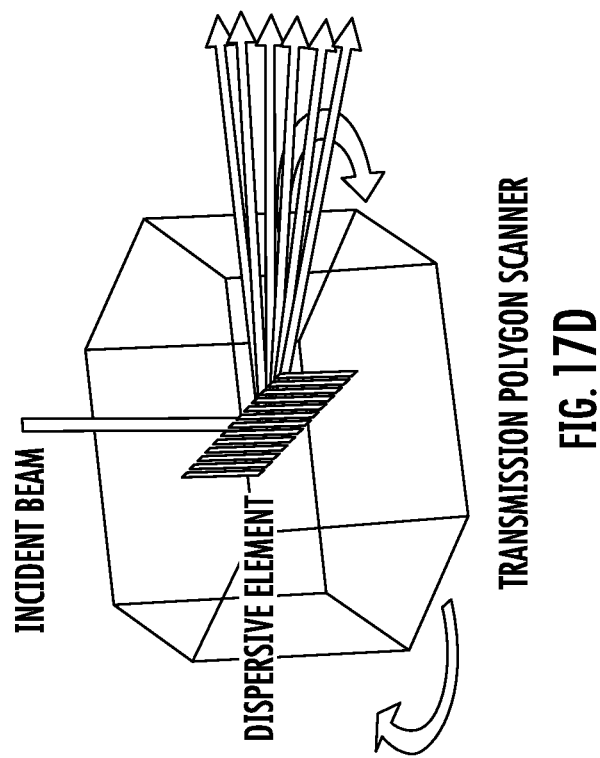

FIG. 17d depicts an optical beam steering device 1775 including a wavelength dispersive element 1776 disposed within a transmissive beam scanner 1777. FIG. 17e depicts a top down view of an optical beam steering device 1780 such as the optical beam steering device 1775 of FIG. 17d. An incident beam is directed into the beam scanner 1777 toward the wavelength dispersive element 1776 disposed on the inside. The beam scanner 1727 may be rotatable (e.g., connected to an actuator) about an axis and is able to steer the beam about an angle (e.g., the first angle θ or the second angle φ) into the external environment. The tuning of the beam allows for the beam to be steered into the external environment about a second angle. Moreover, the outer shape of the beam scanner 1777 may also serve as optical element that refracts the beam into the external environment at a greater or smaller angle. In some embodiments, the beam scanner 1777 is made from glass, fiber, or a polymer that allows for the beam to pass through. In some embodiments, the beam scanner 1777 is a polygon, circle, square or other shape.

Figure 18A:
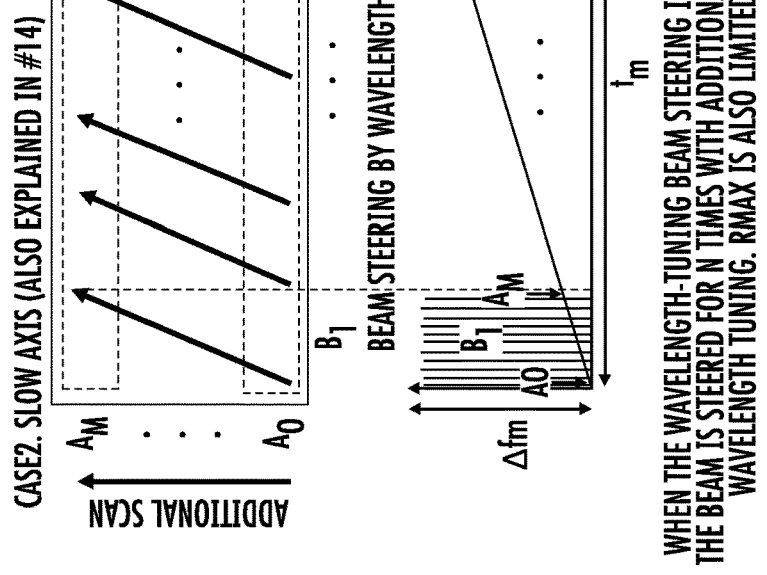
FIGS. 18a-b depict examples of LIDAR scanning using the beam steering devices of FIGS. 17a-e in accordance with an illustrative embodiment.
Figure 18B:
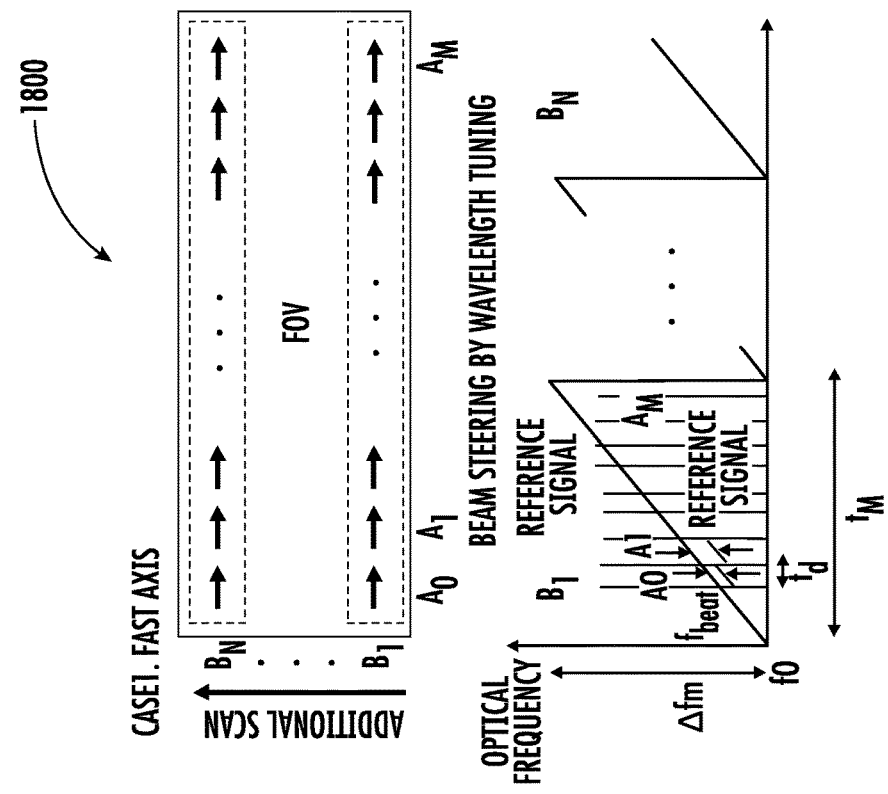

Referring to FIGS. 18a-b, examples of LIDAR scanning using the beam steering devices of FIGS. 17a-e are depicted. It is to be appreciated, however, that the examples depicted in FIGS. 18a-b are not limited to the devices of FIGS. 17a-e. For example, FIGS. 18a-b are intended for use in explanation of the two configurations where wavelength tuning is assigned to the slow axis and fast axis, respectively, in two dimensional beam steering. FIG. 18a depicts an example of LIDAR scanning 1800 along the fast axis. FIG. 18b depicts an example of LIDAR scanning 1850 along the slow axis. Referring now to FIG. 18a, when the wavelength tuning beam steering is assigned to the fast axis, the wavelength tuning repeats (e.g., full scans from first to last frequency) N times with N additional beam scans (e.g., B1-BN).

Referring now to FIG. 18b, when the wavelength-tuning beam steering is assigned to the slow axis, the beam is steered for N times with additional beam steering during the single wavelength tuning. When the frame rate is fixed to be a set amount, the tuning period for the slow-axis scan is 1 over the set amount, however, the tuning period for the fast-axis scan is 1 divided by the set amount divided by N. Thus, the maximum detection range for the slow-axis scan is N times longer than the maximum detection range for the fast-axis scan for the same frame rate.

Figure 19:
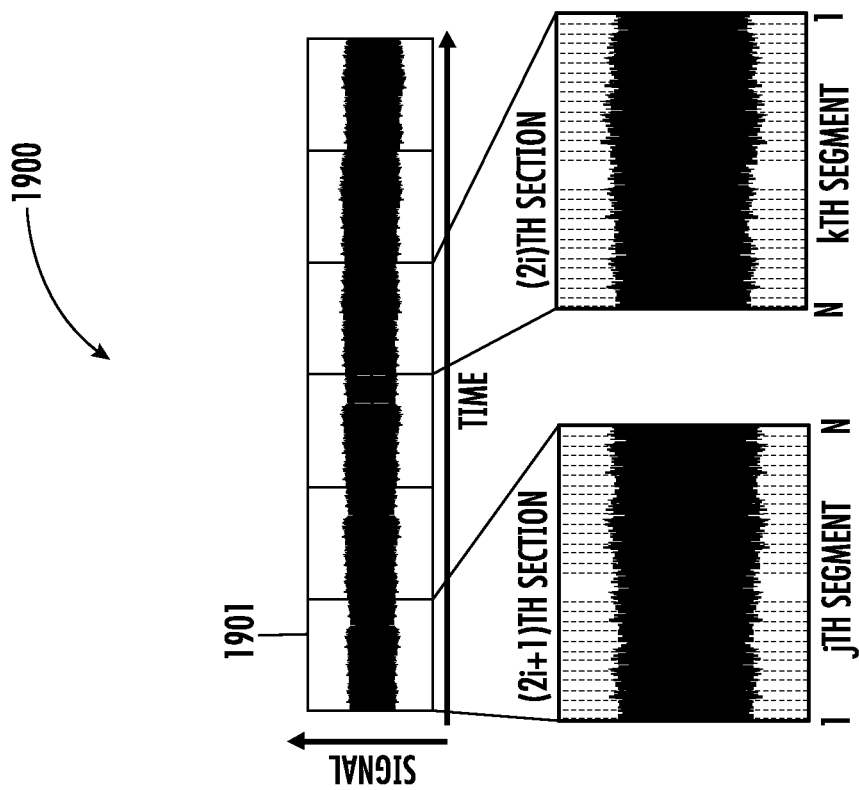
FIG. 19 depicts examples of LIDAR scanning using a micro-electromechanical (MEMS) scanner in accordance with an illustrative embodiment.
Figure 19:
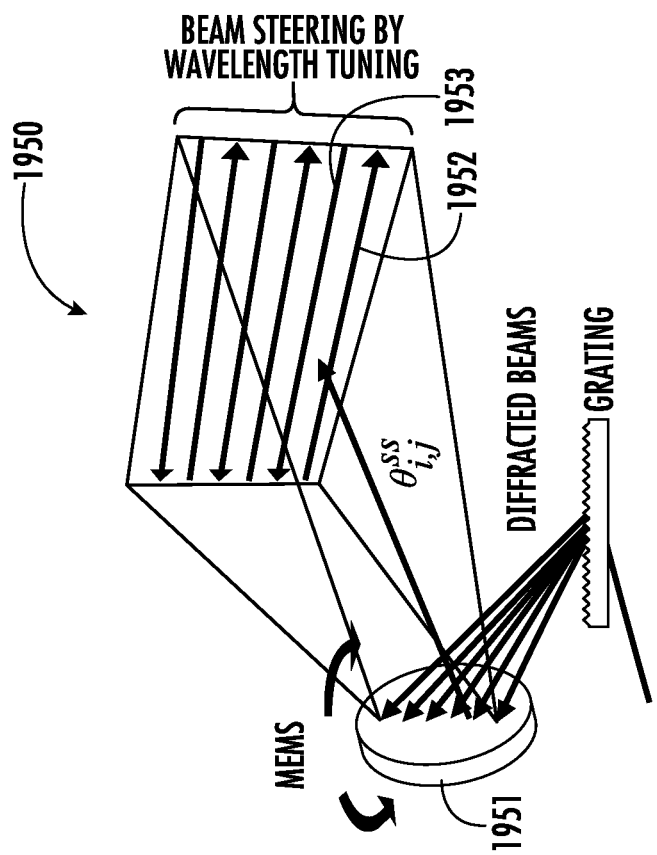

Referring to FIG. 19, examples of LIDAR scanning 1950 using a micro-electromechanical (MEMS) scanner is depicted. In FIG. 19, an optical beam steering device 1900 includes a micro-electromechanical (MEMS) mirror 1951 along with a wavelength dispersive element 1952. When the beam steering is done by wavelength tuning for the slow axis of a two-dimensional beam steering and a beam scanner such as a polygon scanner as described above is used for the fast axis, the beam is steered along the same direction (e.g., from left to right in the figure) for each scan. When a different type of beam scanner such as the MEMS mirror 1951 is used, the beam may be raster-scanned. That is, the beam may be scanned from left to right for a first scan 1952 and from right to left for a second (e.g., subsequent) scan 1953 and so on. Accordingly, the order of segments at each section in the interference signal 1901 are also alternates during the processing and/or creation of the density plots.

Figure 20:
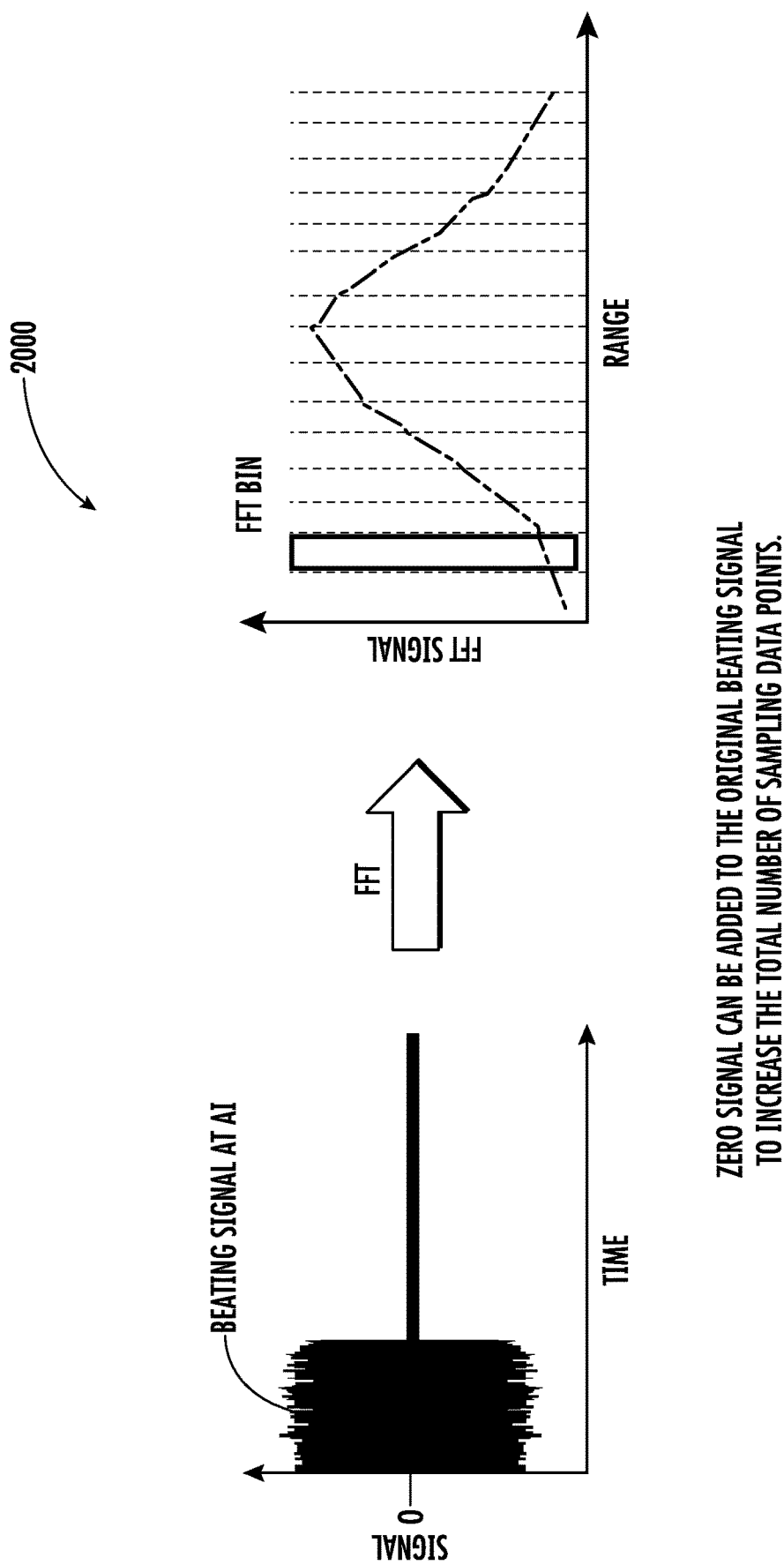
FIG. 20 depicts an example of zero-padding to increase the number of FFT bins in accordance with an illustrative embodiment.

Referring to FIG. 20, an example of zero-padding 2000 to increase the number of FFT bins is depicted. The total number of FFT bins and the size of each FFT bin are determined by sampling data points used for FFT analysis. In this example, a zero signal is added to the original beating signal to increase the total number of sampling data points.

As a result, the total number of FFT bins can be increased and the size of each FFT bin can be smaller. This allows for an increased range resolution of the FFT signals. In some embodiments, the zero signal can be added before or after (or before and after) the original beating signal. In some embodiments, the zero-padding can be done before or after the resampling as described above. In some embodiments, the total number of the added zero signal can be varied for the different segments.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions.

Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may of course vary.

It is also to be understood that the terminology used herein is for the purpose of describing particular embodiments only, and is not intended to be limiting. It is also to be understood by one skilled in the art that "based on" should be construed as "based at least on" unless explicitly stated otherwise.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety.

Definitions that are contained in text incorporated by reference are excluded to the extent that they contradict definitions in this disclosure.

Other embodiments are set forth in the following claims.

What is claimed is:

1. A light detecting and ranging (LIDAR) system, the system comprising:
    a light source configured to generate a beam that is tunable over a range of frequencies;
    an optical beam steering device positioned to receive at least a portion of the beam and configured to sweep the beam over a range of angles in a field of view (FOV), wherein each discrete frequency of the beam corresponds to a different angle in the FOV;
    a detector positioned to receive portions of the beam that are reflected from an object within the FOV and configured to generate an interference signal based on the received portions of the beam; and
    a processor communicably coupled to the detector, the processor configured to:
        cause the light source to tune the beam from a first frequency to a second frequency; and
        calculate a range of an object corresponding to either the first frequency or the second frequency within the FOV, wherein, to calculate the range of the object, the processor is configured to segment the interference signal using a window function, wherein the window function corresponds to a particular segment of the FOV.

2. The system of claim 1, further comprising an N number of light sources each configured to generate a beam, and an N number of detectors each configured to receive portions of respective beams and generate respective interference signals, wherein the optical beam steering device comprises a first optical element and a wavelength dispersive element.

3. The system of claim 1, wherein the processor is further configured to:
    determine a region of interest (ROI) within the FOV based on the object; and
    cause the light source to sweep from a third frequency to a fourth frequency, wherein the third frequency and the fourth frequency correspond to the ROI.

4. The system of claim 1, further comprising an N number of detectors each configured to receive portions of the beam and generate respective interference signals, wherein the optical beam steering device comprises a first optical element and an N number of wavelength dispersive elements.

5. The system of claim 1, further comprising an N number of detectors each configured to receive portions of the beam and generate respective interference signals, wherein the optical beam steering device comprises a first optical element, a wavelength dispersive element, and an N number of mirrors.

6. The system of claim 1, further comprising:
an interferometer; and
a beam splitting device positioned between the light source and the optical beam steering device, the beam splitting device configured to receive the beam generated by the light source and split the beam into an object beam that is directed toward the optical beam steering device and a reference beam that is directed toward the interferometer;
wherein the interferometer is configured to detect frequencies of the reference beam.

7. The system of claim 1, wherein to calculate the range of the object, the processor is configured to:
low pass filter (LPF) the interference signal, wherein the LPF has a cutoff frequency based on a maximum beat frequency that corresponds to a maximum distance; and
determine the range via a frequency counter or a fast Fourier transform (FFT) of the filtered interference signal.

8. The system of claim 1, wherein the light source comprises a cascade of multiple tunable lasers, wherein each of the tunable lasers comprises a different sweep rate and bandwidth.

9. The system of claim 1, wherein the optical beam steering device comprises a 1×N divider and a wavelength dispersive element, and wherein each path of the 1×N divider comprises a different time delay.

10. The system of claim 1, wherein the optical beam steering device comprises a 1×N divider and an N number of wavelength dispersive elements, each of the N number of wavelength dispersive elements corresponding to an output of the 1×N divider, and wherein each path of the 1×N divider comprises a different optical phase delay.

11. A system, comprising:
a light source configured to generate a beam that is tunable over a range of frequencies;
an optical beam steering device positioned to receive at least a portion of the beam and configured to sweep the beam over a range of angles in a field of view (FOV), wherein each discrete frequency of the beam corresponds to a different angle in the FOV;
a detector positioned to receive portions of the beam that are reflected from an object within the FOV and configured to generate an interference signal based on the received portions of the beam; and
a processor communicably coupled to the detector, the processor configured to:
cause the beam to sweep from a first frequency at a first time to a second frequency over a time period; and
calculate a range of an object in the FOV based on the interference signal, wherein, to calculate the range of the object, the processor is configured to segment the interference signal using a window function, wherein the window function corresponds to a particular segment of the FOV.

12. The system of claim 11, wherein the processor is further configured to generate a two-dimensional peak plot of the FOV based on the interference signal.

13. The system of claim 12, wherein to generate the two-dimensional peak plot, the processor is configured to:
segment the interference signal into multiple segments, each of the multiple segments corresponding to a portion of the FOV;
generate an fast Fourier transform (FFT) for each of the multiple segments; and
detect a peak for each FFT.

14. The system of claim 11, wherein the optical beam steering device comprises beam scanner and a wavelength dispersive element, and wherein the beam scanner is rotatable via an actuator.

15. The system of claim 14, wherein the beam scanner is transparent and the wavelength dispersive element is disposed within the beam scanner.

16. A method of detecting of an object within a field of view (FOV) of a sensing system, the method comprising:
controlling, via a processor, a light source to project a beam that is swept from a first frequency to a last frequency starting at a first time over a first time period;
directing the beam into a FOV at angles depending on frequency;
generating an interference signal based on received portions of the beam from an object in the FOV; and
determining, via the processor, a position of the object relative to the sensing system, wherein determining the position of the object comprises segmenting the interference signal using a window function, wherein the window function corresponds to a particular segment of the FOV.

17. The method of claim 16, wherein controlling the light source comprises:
controlling, via the processor, an N number of light sources to project respective beams from the first frequency to the last frequency; and
generating, via an N number of detectors, respective interference signals based on respective received portions of the beams from objects within the FOV.

18. The method of claim 16, further comprising:
determining, via the processor, a region of interest (ROI) in the FOV; and
controlling the light source to project a beam from a third frequency to a fourth frequency over a second time period, wherein the third frequency and the fourth frequency correspond to the ROI.

19. The method of claim 17, wherein directing the beam into the FOV comprises:
receiving the beam at a plurality of wavelength dispersive elements; and
directing the beam from each of the plurality of wavelength dispersive elements throughout the FOV, wherein the FOV is two dimensional.

* * * * *